(12) United States Patent
Yoshida et al.

(10) Patent No.: US 6,718,071 B2
(45) Date of Patent: Apr. 6, 2004

(54) IMAGE READING APPARATUS AND METHOD

(75) Inventors: Mitsuhiro Yoshida, Kawasaki (JP); Tamio Amagai, Kawasaki (JP); Noriaki Yamazaki, Kawasaki (JP); Hiroyuki Maruyama, Kawasaki (JP); Takeshi Kimura, Kawasaki (JP)

(73) Assignee: PFU Limited, Kahoku-Gun (JP)

( * ) Notice: Subject to any disclaimer, the term of this patent is extended or adjusted under 35 U.S.C. 154(b) by 11 days.

(21) Appl. No.: 09/949,788

(22) Filed: Sep. 12, 2001

(65) Prior Publication Data

US 2003/0024792 A1 Feb. 6, 2003

(30) Foreign Application Priority Data

Mar. 29, 2001 (JP) .......................................... 2001-097345

(51) Int. Cl.⁷ .................................................. G06K 9/36
(52) U.S. Cl. .......................... 382/289; 358/1.5; 358/1.9
(58) Field of Search ................................ 382/289, 291, 382/312, 295, 296; 358/1.5, 1.9, 488, 498; 399/371, 367, 395

(56) References Cited

U.S. PATENT DOCUMENTS

| | | | | |
|---|---|---|---|---|
| 5,528,387 A | * | 6/1996 | Kelly et al. | 358/488 |
| 5,784,680 A | * | 7/1998 | Taruki | 399/374 |
| 5,854,964 A | * | 12/1998 | Atsumi | 399/371 |
| 5,918,877 A | | 7/1999 | Takei et al. | 271/261 |
| 6,064,778 A | * | 5/2000 | Pasco et al. | 382/289 |
| 6,408,094 B1 | * | 6/2002 | Mirzaoff et al. | 382/224 |
| 6,438,351 B2 | * | 8/2002 | Kawachi et al. | 399/394 |

FOREIGN PATENT DOCUMENTS

| | | |
|---|---|---|
| JP | 60-153571 | 8/1985 |
| JP | 61-175874 | 8/1986 |
| JP | 4-190146 | 7/1992 |
| JP | 5-276337 | 10/1993 |
| JP | 5-321135 | 12/1993 |
| JP | 8-251387 | 9/1996 |
| JP | 9-2704 | 1/1997 |
| JP | 9-61218 | 3/1997 |
| JP | 9-65061 | 3/1997 |
| JP | 9-270009 | 10/1997 |
| JP | 11-334043 | 12/1999 |
| JP | 2000-217124 | 8/2000 |
| JP | 2000-244728 | 9/2000 |

\* cited by examiner

*Primary Examiner*—Yon J. Couso
(74) *Attorney, Agent, or Firm*—Westerman, Hattori, Daniels & Adrian, LLP

(57) ABSTRACT

The invention provides an image reading apparatus and method capable of performing skew error correction at high speed. In an image reading apparatus that conveys a stacked medium along a conveyance path, reads an image of the medium being conveyed, and discharges the medium after reading the image, the apparatus comprises calculation means for calculating the amount of skew of the medium while being conveyed, and correction means for correcting the amount of skew of the medium in accordance with the amount of skew calculated by the calculation means. The correction means comprise determination means for determining whether correction for the amount of skew should be performed or not, and control means for correcting the amount of skew of the medium. The calculation means comprise medium detection means for detecting the state of the medium conveyed along the conveyance path, and calculate the amount of skew from the detected result of the state of the medium. The control means comprise correction control means for correcting the amount of skew based on the amount of skew of the medium calculated by the calculation means when the determination means determine to correct the amount of skew. The calculation means comprise image reading means for reading an image of the medium conveyed along the conveyance path at a position closer on the conveyance path to the discharging side than the medium detection means, and calculate the amount of skew from the image data of the medium read by the image reading means.

10 Claims, 21 Drawing Sheets

SF1: SHEET DETECTION SENSOR
SF2: SURFACE READING TIMING SENSOR
SB5: B5 WIDTH DETECTION SENSOR
SA4: A4 WIDTH DETECTION SENSOR
SB4: B4 WIDTH DETECTION SENSOR
SA3: A3 WIDTH DETECTION SENSOR

A: SKEW DISTANCE IN MAIN SCANNING DIRECTION
B: SKEW DISTANCE IN SUBSCANNING DIRECTION

AFFINE TRANSFORMATION
ORIGIN IS MOVED $\tan \dfrac{b}{a}$

CALCULATION OF SKEW ANGLE FROM NUMBER OF PIXELS a AND b

BACKING IS
  WHITE IN FIG. 15A
  BLACK IN FIG. 15B

○ ORIGINAL IMAGE
● DESIRED IMAGE
X1=Dx−S00x, X2=S10x−Dx,
Y1=Dy−S00y, Y2=S01y−Dy

EACH POINT ○ IS TRANSFORMED TO POINT ●

IMAGE READING APPARATUS AND METHOD

BACKGROUND OF THE INVENTION

1. Field of the Invention

The present invention relates to an image reading apparatus and method suitable for use in the correction of skew error of a medium.

2. Description of the Related Art

In recent years, an image reading apparatus has been developed that allows documents of multiple sizes to be read. For this purpose, the image reading apparatus is provided with detection means for detecting the size of documents.

Operation of the conventional image reading apparatus will be described below with reference to a flow chart of FIGS. 4A and 4B, and an explanatory view of a sensor unit of FIG. 5. The sensors shown in FIG. 5 are sensors of a transmission type, and a skew angle is detected with sensors SB4, SB5, SF1, SA4, and SA3.

Before starting the reading of documents, an operator first sets the size of the document (S1). Then, at the start of reading, the rotation of a conveyance motor for driving a conveyance roller or the like is started (S2). When a predetermined time, for example 50 msec, has elapsed after the start of the rotation of the conveyance motor, a first clutch and a second clutch are switched on to start driving the conveyance roller (S4).

When the first document is picked, it is determined whether or not any of a plurality of size sensors (4 sensors in the example shown) has been turned, that is, whether a document has been detected or not (S5). If it is determined at step S5 that no document has been detected by the size sensors, it is determined whether SF1 has detected a document or not(S6). If, at step S6, it is determined that no document has been detected by SF1, it is determined at step S7 whether a certain time (2 seconds in this example) has elapsed after the start of picking of documents or not. If, at step S7, it is determined that the 2 seconds have not elapsed, picking of documents is retried at a shorter interval (in units of 0.5 second in this example) at step S8. On the other hand, if it is determined, at step S7, that the 2 seconds have elapsed, judging that the document has not been conveyed normally, pick error processing is performed (S9). Then, the conveyance motor is stopped (S10), and the operator confirms the existance of the document again, and repeats the pick operation.

On the other hand, if, at step S6, it is determined that a document has been detected by SF1, and judging that some trouble has occurred because no document has been detected by any of size sensors at step S5, pick error processing is performed at step S9. Then, at step S10, the conveyance motor is stopped.

If, at step S5, it is determined that any of the size sensors has detected the document, and judging that picking of the document has been normally completed, the name of the size sensor that was first turned on is stored in a memory (S11), and counting of the pulses of the conveyance motor after the size sensor detected the document is started (S12). Next, the present state of the sensor is stored in the memory (S13). At step S14, it is determined whether a size sensor for a size exceeding the set document size is ON or OFF. If it is determined to be ON, the process moves to step S15. If it is determined to be OFF, the process moves to step S17.

At step S15, the skew error correction processing is performed. That is, at step S16, the conveyance motor is stopped, and then the pick operation is repeated. At step S17, it is determined whether or not SF1 has detected the document. If, at step S17, it is determined that SF1 has not detected the document, it is checked, at step S18, whether or not the count of pulses has exceeded a specified number of pulses. Since necessary number of pulses after the size sensor detects the document until SF1 detects the same document, when the document is conveyed normally, is known beforehand, it can be determined whether the document has been conveyed normally or not by counting the pulses after the size sensor detects the document until SF1 detects the same document and by comparing the number of counted pulses with the specified number.

If the counted number exceeds the specified number, and judging that the document has not been conveyed, jam error processing is performed (S19). That is, the conveyance motor is stopped at step S20, and then the pick operation is repeated. On the other hand, if, at step S18, the counted number does not exceed the specified number of pulses, the process returns to step S13.

On the other hand, at step S17, if SF1 has detected the document, the first clutch is turned off and driving of the pick roller is stopped (S21). Then, calculation of skew (skew angle) is performed (S22). At step S23, it is determined whether or not an abnormal deviation (skew angle of 10° or more) has occurred. If it is determined that abnormal deviation has occurred, the process moves to step S15. If it is determined that abnormal deviation has not occurred, the process moves to step S24. Then, the pulses of the conveyance motor after SF1 detected the document are counted (S24). Thereafter, it is determined whether the surface reading timing sensor SF2 has detected the document or not (S25).

If, at step S25, it is determined that SF2 has detected the document, the second clutch is turned off and pick operation for the next document is performed at S26. On the other hand, if, at step S25, it is determined that SF2 has not detected the document, it is determined at step S27 whether or not the counted number of pulses has exceeded the specified number of pulses. If the counted number has exceeded the specified number of pulses, jam error processing is performed (S19). If the counted number has not exceeded the specified number of pulses, the process returns to step S25, where it is again determined whether or not SF2 has detected the document.

Here, in the case of an image reading apparatus, the skew of the conveyed medium manifests itself as tilting of the read image. Therefore, the occurrence of skew error has been conventionally detected based on the degree of tilting of read image.

FIG. 6 is a view useful for explaining the conventional method of skew detection. In this figure, the portion enclosed by dotted line shows the state of a document read when no skew has occurred, as seen on a display. The portion enclosed by solid line shows the state of the document read when skew has occurred, as seen on a display.

In the figure, A shows the amount of skew in the main scanning direction, and corresponds to the difference between left end and right end of the leading edge of the document. B shows the amount of skew in the subscanning direction, and, in this figure, corresponds to the difference of the leading edge and the trailing edge of the document.

In this detection method, the proportion of the values A and B shown in FIG. 6, in relation to the length of sheet in the main scanning direction and in the subscanning direction respectively, was determined, and if A/B was 1% or less of the length of sheet in the main-/sub-scanning direction, respectively, the document was regarded as normal, and if A/B was beyond this range, the document was determined to be abnormal.

However, with this detection method, an operator had to identify the difference in both main- and sub-scanning directions on the display. Thus, for each document read, an operator had to identify on the display whether skew error has occurred or not, and this put a heavy burden on the operator.

Further, in recent years, the operation speed of a document reading apparatus has become increasingly higher so that it has become more and more difficult for an operator to confirm whether skew error has occurred or not for each document. Even if occurrence of skew error is identified, there is another problem that it is very difficult to perform proper skew error correction processing corresponding to the skew error rapidly.

When amount of skew error is calculated from the read image, the document usually has a white background, and the images or the characters are colored in most cases. Thus, in order to detect the skew of the document reliably, a greater contrast at the time of reading is more desirable. Therefore, it is desirable that color of the backing of the image reading unit be set as black so as to allow more reliable judgement of the skew of the medium. However, in order to read an image with black backing and to determine the skew angle reliably, processing such as the detection of the edge portion of the backing and the document from the read image is necessary so that calculation of the amount of skew becomes very time consuming.

In reading an ordinary image, in order to reproduce the gradation of the document, it is also necessary to read the output value of white color in the reader unit and to thereby correct the reference value. This is because it is difficult, in the reader unit, to illuminate the document, by the light source, uniformly in the main scanning direction, with light intensity generally decreasing toward both ends of a light source if the light source is a long device such as a fluorescent lamp. There is also a fluctuation in the sensitivity of a CCD that converts the reflected light into an electrical signal so that a non-uniform signal is generated from the CCD each time of reading a document, leading to another problem that the reproduction of accurate gradation of the document is not possible. In addition, as the temperature of the light source rises as time passes, the output voltage becomes higher even if the same color is read. As a result, when the read image is output and compared with the actual document, it sometimes happens that a grey document turns out to be a white image. Therefore, it is necessary to reproduce the gradation of the actual document accurately by reading the output voltage of white for reference before the image is read by the image reader, and by correcting the output signal from the CCD using the reference value. Especially in the case of reading of color images, that has become popular recently, correction of the white reference value is essential.

Thus, it is desirable to use a black backing for reading an image or detecting the amount of skew. However, in order to follow the variation of light intensity or the fluctuation of the CCD accurately, the reference value is preferably corrected using a white backing before reading of image. In an actual image reading apparatus, the color of the backing is, in most cases, fixed to be either black or white. If the color of the backing is switched each time a document is read, a switching time is required and various processings become very time consuming, so that a high speed apparatus cannot be realized.

Other means for detecting the amount of skew include a method using sensors for detecting the size or the passage of a medium. The amount of skew is detected from the difference of passage time between sensors. An apparatus having means for automatic correction for the skew of a medium based on the detected amount of skew, that is, an apparatus having a function for performing skew error correction by rotating the read image based on the detected amount of skew, is now widely used.

However, in an image reading apparatus which conveys a stacked medium along conveyance path, various kinds of sheets are conveyed including different paper qualities and different kinds of sheets are used. Thus, even if documents are set in the image reading apparatus so as to properly adjust the size of documents to the guide of the apparatus, deviation of the center of the documents from the center of the apparatus may sometimes occur in the course of actual conveyance. This occurs because the width of the sheet guide is set a little greater than the actual width of the sheets. When documents are conveyed with the center deviating from the center of the apparatus, it becomes impossible to convey the documents with the conveyance roller kept at the centerline of the documents. This leads to a skew of the document before the document reaches the image reader.

When the document is smaller in size than the width of the guide, the document may sometimes reach the image reader in a rotating state.

In the case of an image reading apparatus with a high-speed processing function, the amount of skew detected by the sheet passage sensor may sometimes differ from the actual amount of skew when the document arrives at the image reader. This is because the amount of skew continues to increase while the medium is being conveyed. In this case, in order to decide the degree of skew error correction to be performed on the read image, it is important to define the time of skew detection to be used as the basis for performing the correction.

There has been another problem in conventional skew error correction in that a predetermined skew error correction is performed uniformly irrespective of the amount of skew and that skew error correction is performed even in the case where there is no need for correction so that the correction becomes very time consuming.

SUMMARY OF THE INVENTION

It is an object of the present invention to perform skew error correction processing as required by the actual amount of skew at high speed without using unnecessary time.

It is another object of the present invention to realize an accurate and high-speed image reading process that is capable of correcting the white reference value at the time of image reading by switching the backing of the image reader automatically between black and white as necessary, and of detecting and correcting an accurate amount of skew in the image reader when there is a large amount of skew.

To resolve the above problems, according to the present invention, in an image reading apparatus which conveys a stacked medium along a conveyance path, reads an image of the medium during conveyance, and discharges the medium after reading the image, said image reading apparatus is comprised of calculation means for calculating the amount of skew of said medium during conveyance, and correction means for correcting the amount of skew of said medium in accordance with the amount of skew calculated by said calculation means.

In the above image reading apparatus, said correction means include determination means for determining whether correction for said amount of skew should be performed or not, and control means for correcting the amount of skew of said medium when said determination means determine that correction for said amount of skew should be performed.

In the above image reading apparatus, said calculation means include medium detection means for detecting the state of medium being conveyed along said conveyance path, wherein said amount of skew is calculated from the detection result of the state of the medium obtained by the medium detection means, and based on the amount of skew of said medium calculated by said calculation means, said determination means determine whether correction for said amount of skew should be performed or not.

In the above image reading apparatus, said control means include first correction control means for correcting the amount of skew based on said amount of skew of the medium calculated by said calculation means when said determination means determine that correction for said amount of skew should be performed.

In the above image reading apparatus, said calculation means include image reading means for reading the image on the medium at a position on the conveyance path closer to the discharging side than said medium detection means for the medium conveyed along said conveyance path, said amount of skew being calculated from the image data read by the image reading means, and based on the amount of skew of said medium calculated by said calculation means, said determination means determine whether correction for said amount of skew should be performed or not.

In the above image reading apparatus, said control means include second correction control means for correcting the amount of skew based on said amount of skew of the medium calculated by said calculation means when said determination means determine that correction for said amount of skew should be performed.

In the above image reading apparatus, said calculation means comprise image reading means for reading an image of the medium being conveyed along said conveyance path at a point closer on the conveyance path to the discharging side than said medium detection means, and calculate said amount of skew from the image data of the medium read by the image reading means, and based on the amount of skew of said medium calculated by said calculation means, said determination means determine whether correction for said amount of skew should be performed or not.

In the above image reading apparatus, said control means include selection means for selecting, when said determination means determine that correction for said amount of skew should be performed, so as to perform correction for the amount of skew with a first correction control means that amends the amount of skew based on an amount of skew of the medium calculated from the detected result of the state of the medium by the medium detection means if the amount of skew is within a predetermined amount, and with a second correction control means that amends the amount of skew based on an amount of skew of the medium calculated from the image data of the medium read by the image reading means if the amount of skew exceeds the predetermined amount.

In the above image reading apparatus, said second correction control means include a plurality of backings which are provided at a position opposite to said image reading means for reading an image of said medium being conveyed in relation to said medium, and which change the reflectivity of light incident on the medium from the side of the image reading means, and backing switching means for selectively switching to one of said plurality of backings, wherein, when said determination means determine that correction for said amount of skew should be performed, the backing is switched to the one selected by said backing switching means, image data on said medium being read after the switching, said amount of skew being calculated from the read image data by the calculation means, and said amount of skew being corrected based on the calculated result.

In the above image reading apparatus, calculation of said amount of skew is performed such that the position of the corner of said medium is first read from said image data, and said amount of skew is calculated from the position data of said corner and conveyance speed of said medium conveyed on said conveyance path.

To resolve the above problems, in an image reading method which comprises the steps of conveying stacked medium along a conveyance path, reading an image on the medium being conveyed, and discharging the medium after reading the image, said image reading method according to the present invention further comprises a calculation step of calculating the amount of skew of said medium during conveyance, and a correction step of correcting said amount of skew of said medium in accordance with the amount of skew calculated by said calculation means.

In the above image reading method, said correction step comprises a determination step of determining whether said correction for the amount of skew should be performed or not, and a control step of correcting the amount of skew of said medium when the determination step determines that said correction for the amount of skew should be performed.

In the above image reading method, said calculation step comprises a medium detection step of detecting the state of medium being conveyed along said conveyance path, wherein said amount of skew is calculated from the detection result of the state of the medium obtained in the medium detection step, and said determination step determines whether correction for said amount of skew should be performed or not based on the amount of skew of said medium calculated in said calculation step.

In the above image reading method, said control step comprises a first correction control step of correcting the amount of skew based on said amount of skew of the medium calculated in said calculation step when said determination step determines that correction for said amount of skew should be performed.

In the above image reading method, said calculation step comprises an image reading step of reading the image on the medium at a position on the conveyance path closer to the discharging side than the position of the medium conveyed along said conveyance path at the time of detection, said amount of skew being calculated from the image data read, and said determination step determines whether correction for said amount of skew should be performed or not based on the amount of skew of said medium calculated in said calculation step.

In the above image reading method, said control step comprises a second correction control step of correcting the amount of skew based on said amount of skew of the medium calculated in said calculation step when said determination step determines that correction for said amount of skew should be performed.

In the above image reading method, said calculation step comprises an image reading step of reading an image of the medium at a position closer on the conveyance path to the discharging side than the position at the time of detection of said medium being conveyed along said conveyance path, and calculates said amount of skew from the image data of the medium read by the image reading step, and said determination step determines whether correction for said amount of skew should be performed or not based on the amount of skew of said medium calculated in said calculation step.

In the above image reading method, said control step comprises a selection step of selecting, when said determination step determines that correction for said amount of skew should be performed, so as to perform correction for the amount of skew by the first correction control step for amending the amount of skew based on an amount of skew of the medium calculated from the detected result of the state of the medium in the medium detection step if the amount of skew is within a predetermined amount, and by a second correction control step for amending the amount of skew based on an amount of skew of the medium calculated from the image data of the medium read in the image reading step if the amount of skew exceeds the predetermined amount.

In the above image reading method, said second correction control step comprises a backing switch step of selecting and switching to one of a plurality of backings which are provided at a position opposite to an image reading means for reading image on said medium being conveyed in relation to said medium, and which change the reflectivity of light incident on the medium from the side of the image reading means, wherein, when said determination step determines that correction for said amount of skew should be performed, the backing is switched to the one selected in said backing switch step, image data on said medium being read after the switching, said amount of skew being calculated from the read image data in the calculation step, and said amount of skew being corrected based on the calculated result.

In the above image reading method, calculation of said amount of skew is performed such that the position of the corner of said medium is first read from said image data, and said amount of skew is calculated from the position data of said corner and conveyance speed of said medium conveyed on said conveyance path.

DESCRIPTION OF THE PREFERRED EMBODIMENTS

Now, the present invention will be described in detail with reference to the drawings showing embodiments thereof.

Figure 1:
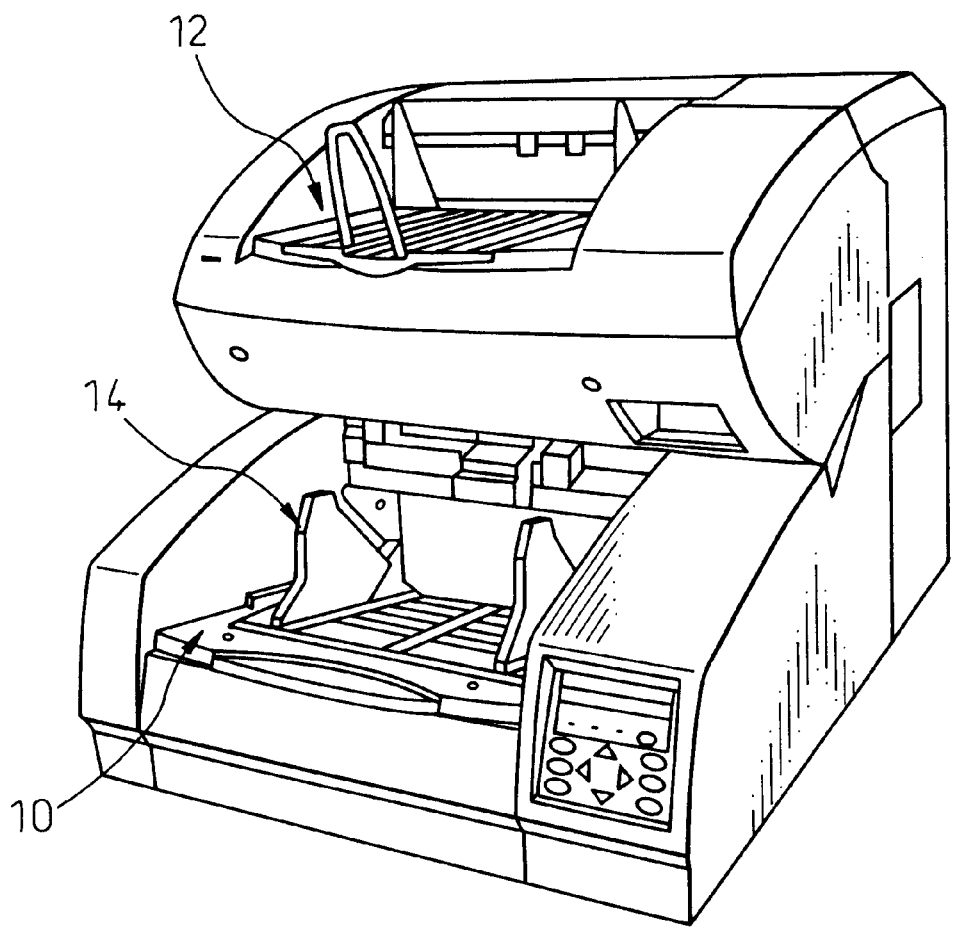
FIG. 1 is a perspective view showing the external appearance of an image reading apparatus according to an embodiment of the present invention.

FIG. 1 is a perspective view showing the external appearance of an image reading apparatus according to an embodiment of the present invention.

In the figure, reference numeral 10 denotes a hopper on which documents to be read are placed.

14 denotes a document guide (sheet guide) for sandwiching a document so as to align it on both side edges and guiding it. 12 denotes a stacker to which the read document is discharged.

Figure 2:
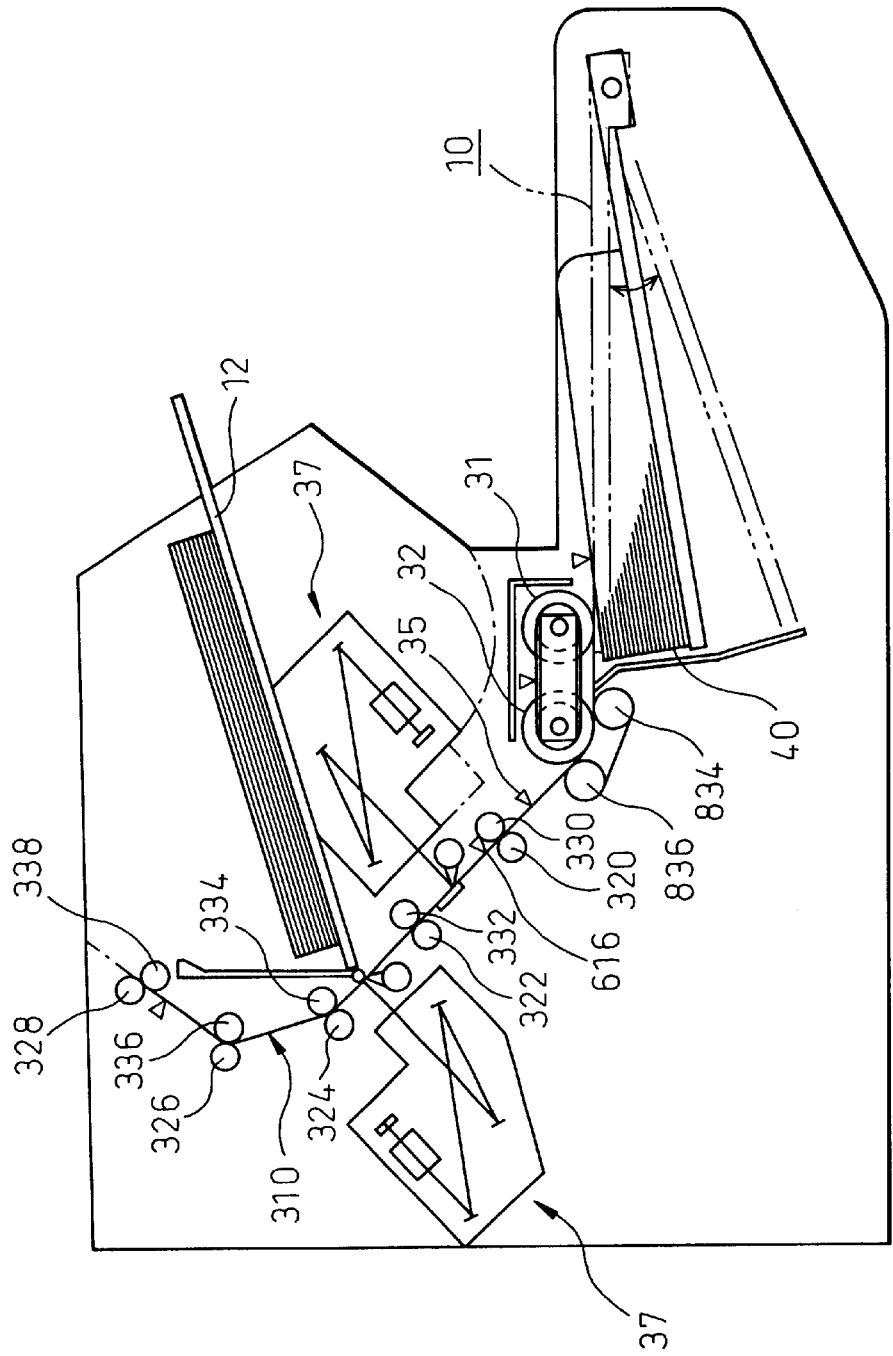
FIG. 2 is a sectional side elevation showing the image reading apparatus according to the embodiment.
Figure 3:
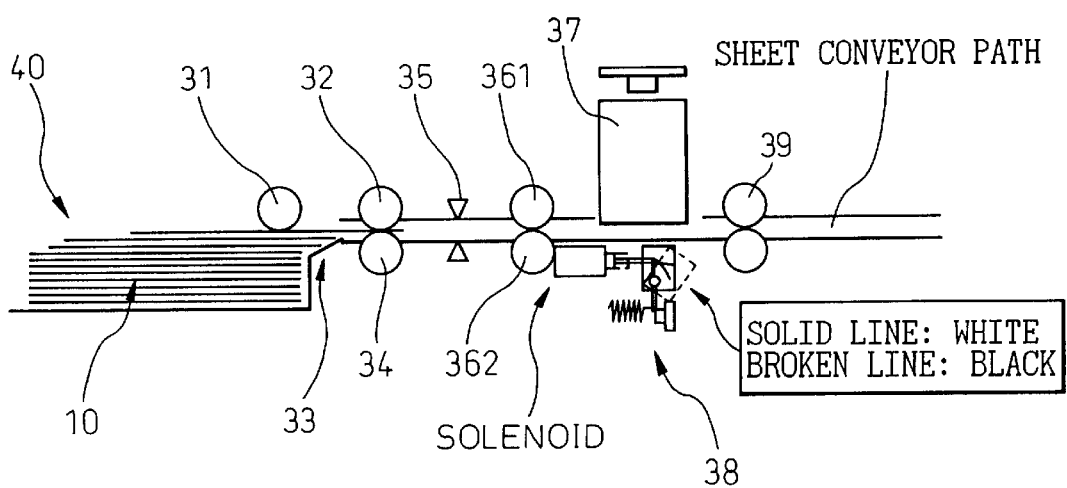
FIG. 3 is a view useful for explaining the conveyance path of the document.
Figure 4A:
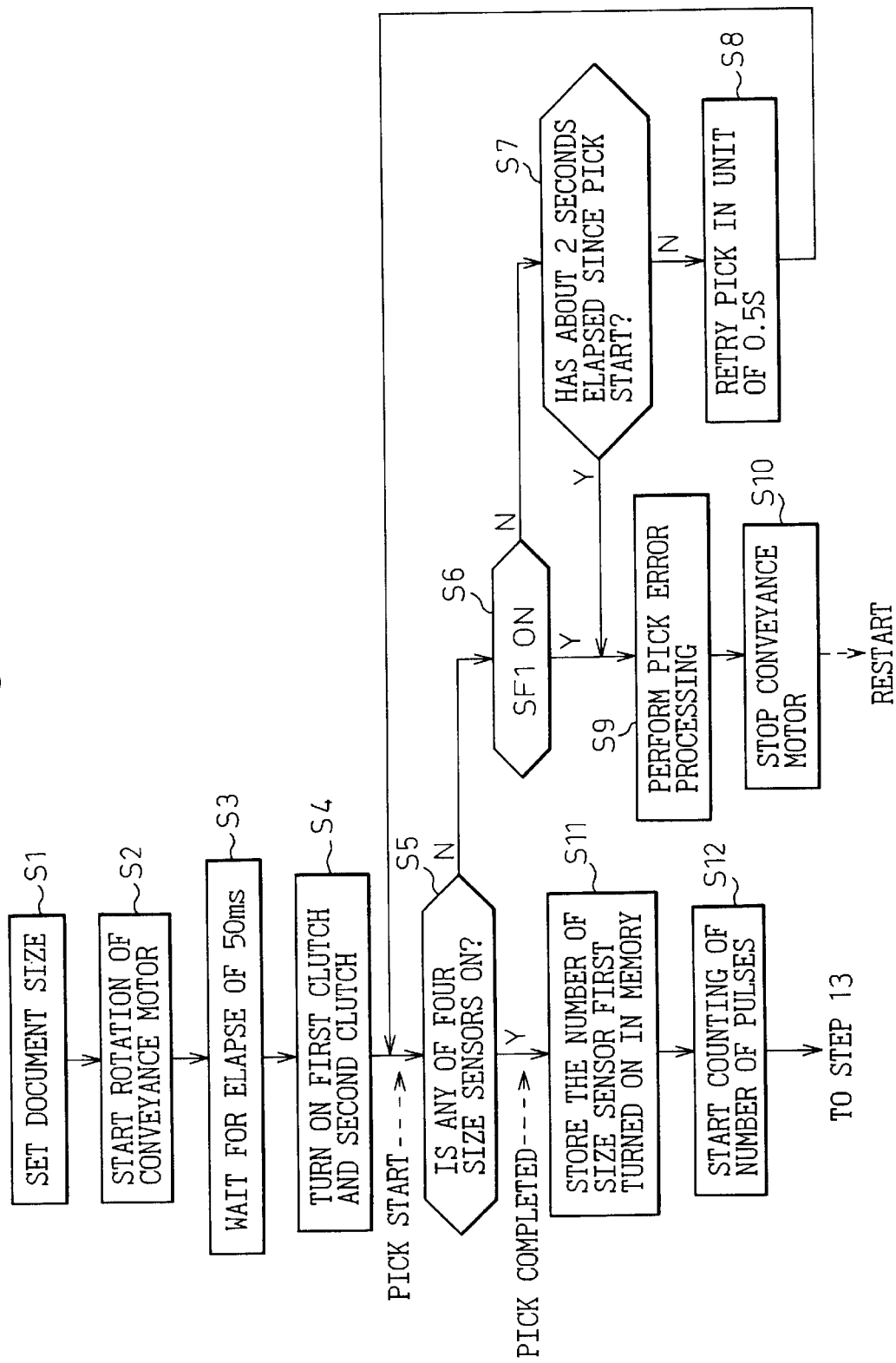
FIGS. 4A and 4B show a flow chart of a process in a conventional image reading apparatus.
Figure 4B:
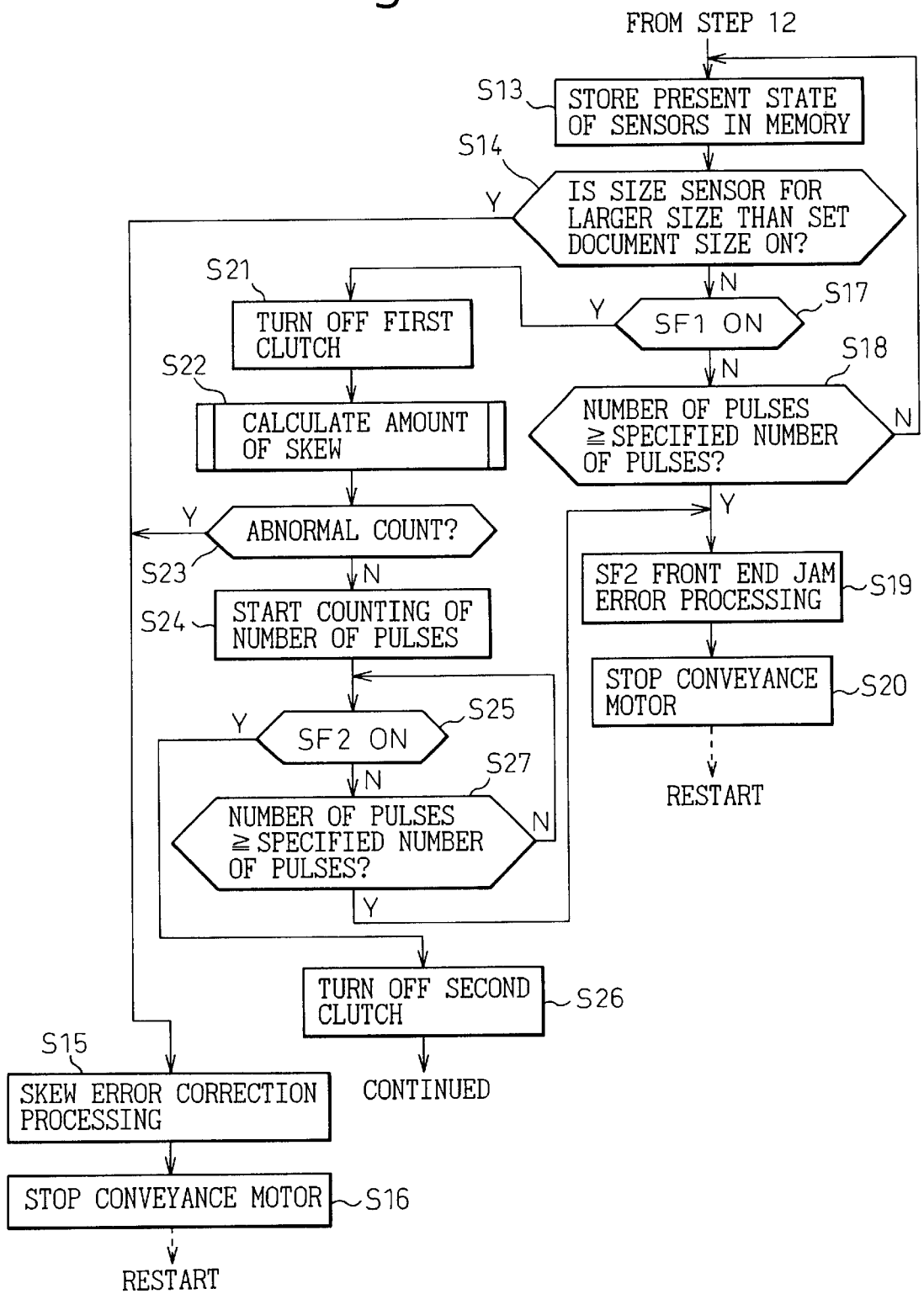
Figure 5:
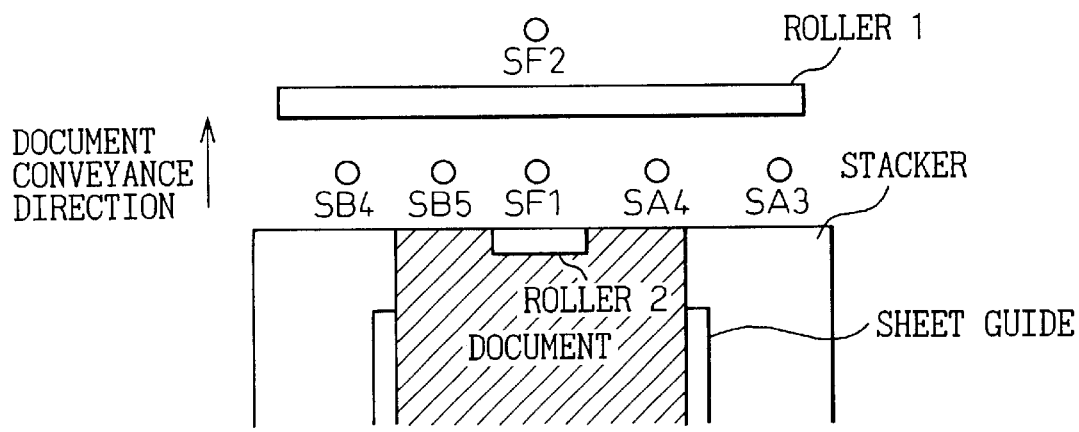
FIG. 5 is a view useful for explaining a sensor unit of the conventional image reading apparatus.
Figure 6:
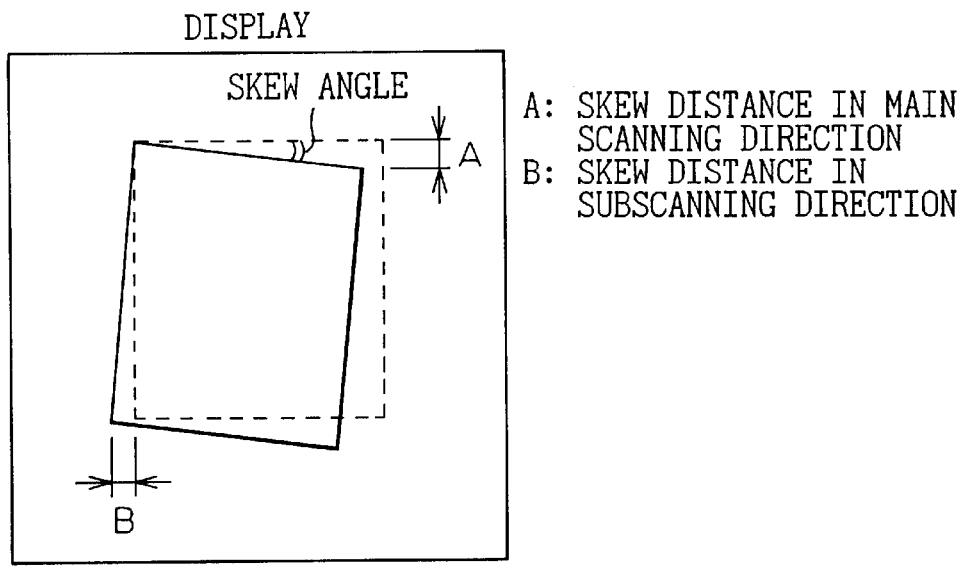
FIG. 6 is a view showing confirmation of a skew on the display in the conventional image reading apparatus.

FIG. 2 is a sectional side elevation showing the document reading apparatus according to the present embodiment, and FIG. 3 is a view useful for explaining the conveyance path. For simplicity, the conveyance path is shown by a straight line. Documents 40 are stacked on the hopper 10. As shown in FIG. 2, documents 40 are picked one by one, and conveyed to the stacked 12.

31 denotes a pick roller for picking a document placed on the hopper 10 and guiding it to the conveyance path. 32 is a separation roller including a pre-separation pad 33 and a brake roller 34 for ensuring that the documents sent out from the pick roller 31 to the conveyance path are sent separately, and not in an overlapping manner. Conveyance rollers, the pick roller 31 and the separation roller 32 are driven by a motor (not shown). 320, 330, 322, 332, 324, 334, 326, 336, 328, and 338 are conveyance rollers, respectively, and are driven by unshown motors. 616 is an image reading timing sensor. The time of conveyance of a document is counted by an unshown timer at the time point when the leading edge of the document is detected, and a reading operation for the document is performed at the time of the arrival of the leading edge of the document at the position of the image reader.

37 is an optical unit for reading images, and reads the document passing through this position. 35 is a sheet detection sensor. A sheet that has passed this sensor is sandwiched between the feed rollers 361, 362 to be sent to the image reader 37.

Figure 7:
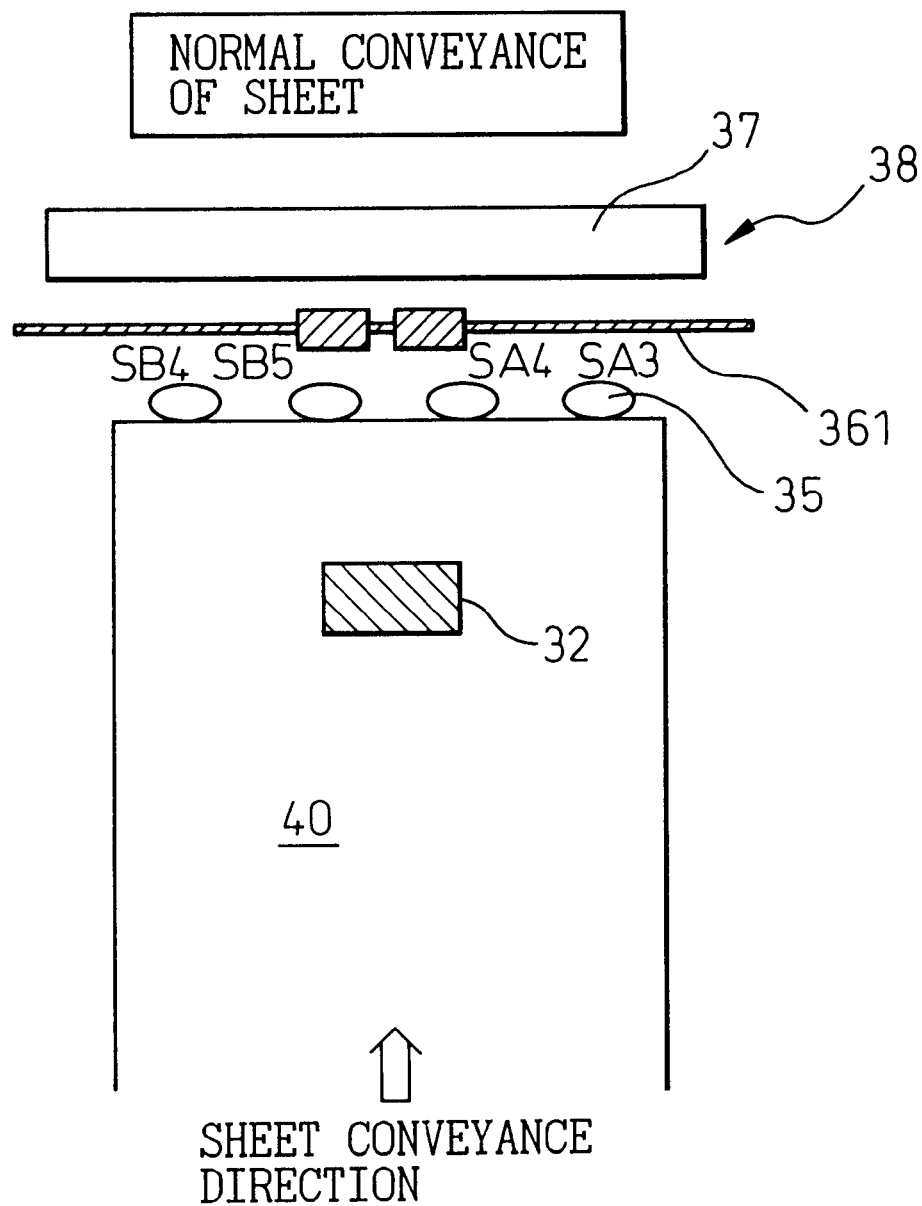
FIG. 7 is a top plan view showing a document conveyance unit according to an embodiment of the present invention (when normally conveyed)

FIG. 7 is a top plan view showing the document conveyance unit of the document reading apparatus according to an embodiment of the present invention. The figure shows the arrangement of a roller and various sensors.

In the image reading apparatus according to the present invention, documents are conveyed utilizing the center line of the apparatus as reference. Thus, the conveyance rollers such as the pick roller, separation roller, and feed roller are provided on the center line of the apparatus.

An unshown surface reading timing sensor is provided at a predetermined distance from the feed roller for detecting the timing of reading the surface of the document. At the time when the leading edge of the document is detected by the surface reading timing sensor, the time of conveyance of a document is counted by an unshown timer, and reading operation for reading the surface of the document is performed at the time when the leading edge of the document arrives at the position of the reading sensor.

SA4, SA3, SB4, and SB5 are the A4 width sensor, A3 width sensor, B4 width sensor, and B5 width sensor, respectively. By detecting a document with these sensors, the size of the document passing through the sensor position can be determined. For example, if SA4 is ON and SA3, SB4 corresponding to larger sizes than an A4 document are OFF, the size of the document passing through the sensor position is determined to be A4.

SA4, SA3, SB5, and SB4 are disposed on the same line so that, if there is no skew of the document, the leading edge of the document is detected by various sensors at the same time. Optical sensors, for example, transmission type sensors, reflection type sensors or the like may be adopted for this purpose.

Next, detection and calculation method for calculating the amount of skew according to an embodiment of the present invention will be described.

FIG. 7 shows the state in which a sheet is conveyed normally. In this case, the four sheet passage detection sensors detect the sheet simultaneously.

Figure 8:
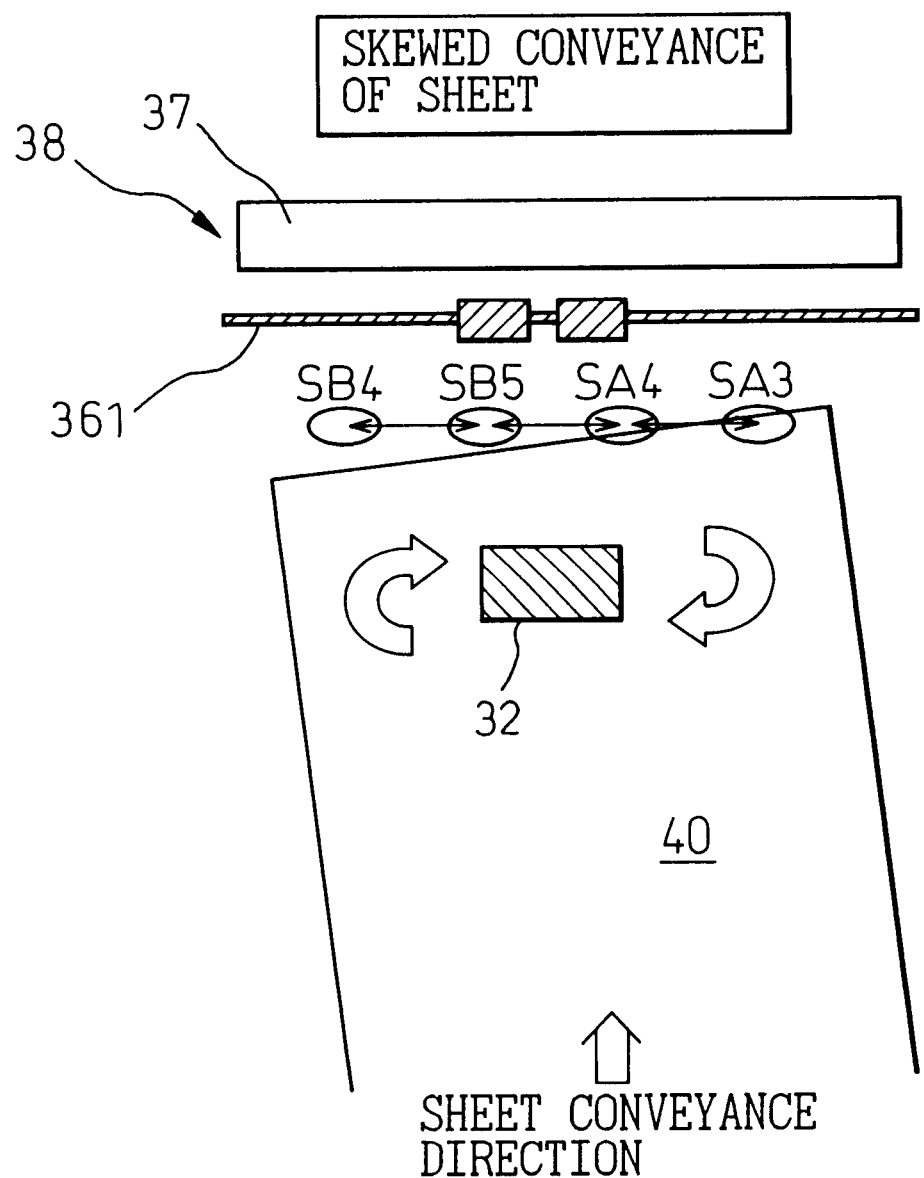
FIG. 8 is a top plan view showing a document conveyance unit according to an embodiment of the present invention (when the document is skewed)
Figure 9A:
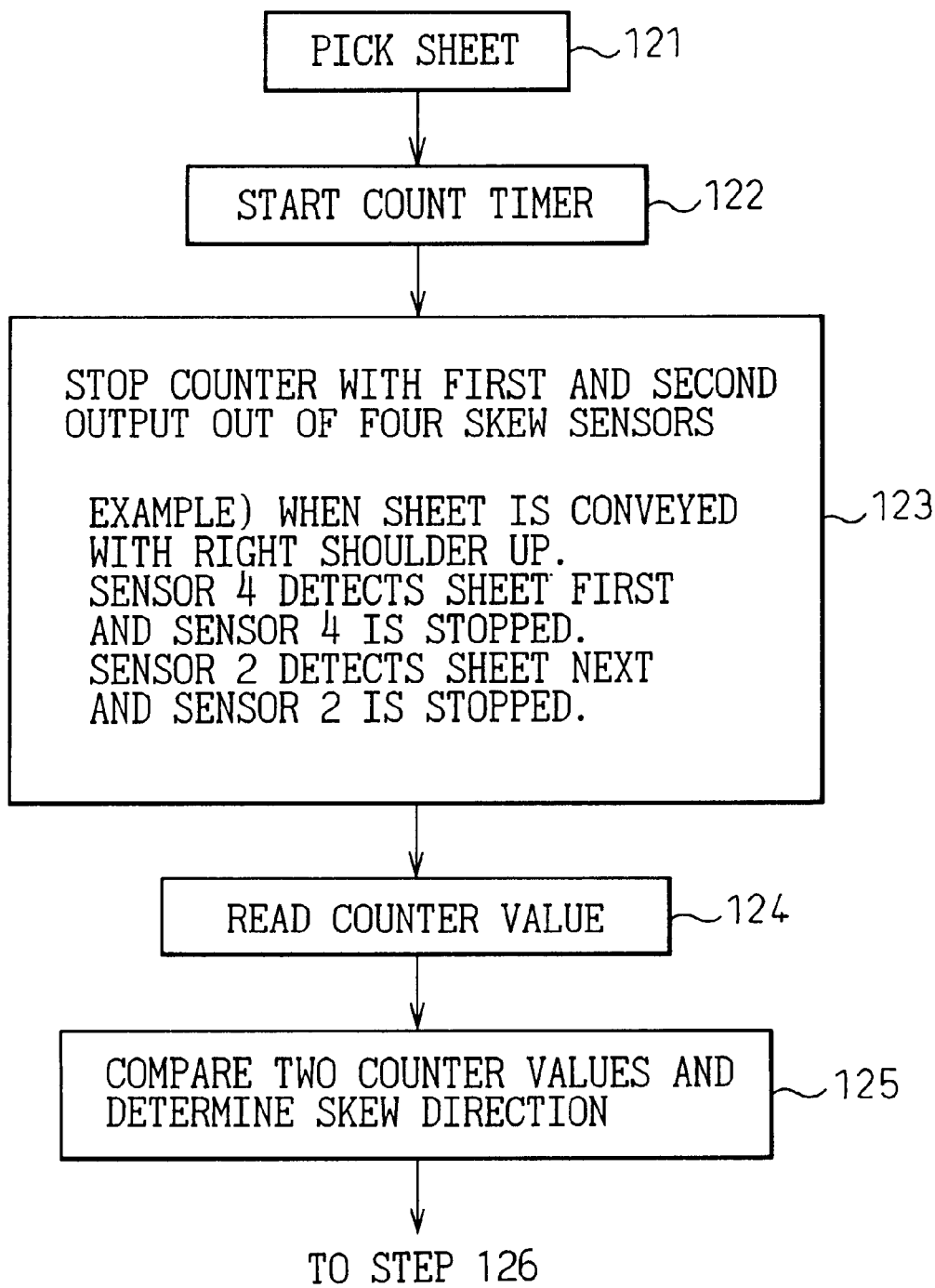
FIGS. 9A and 9B show a flow chart of skew angle detection process.
Figure 9B:
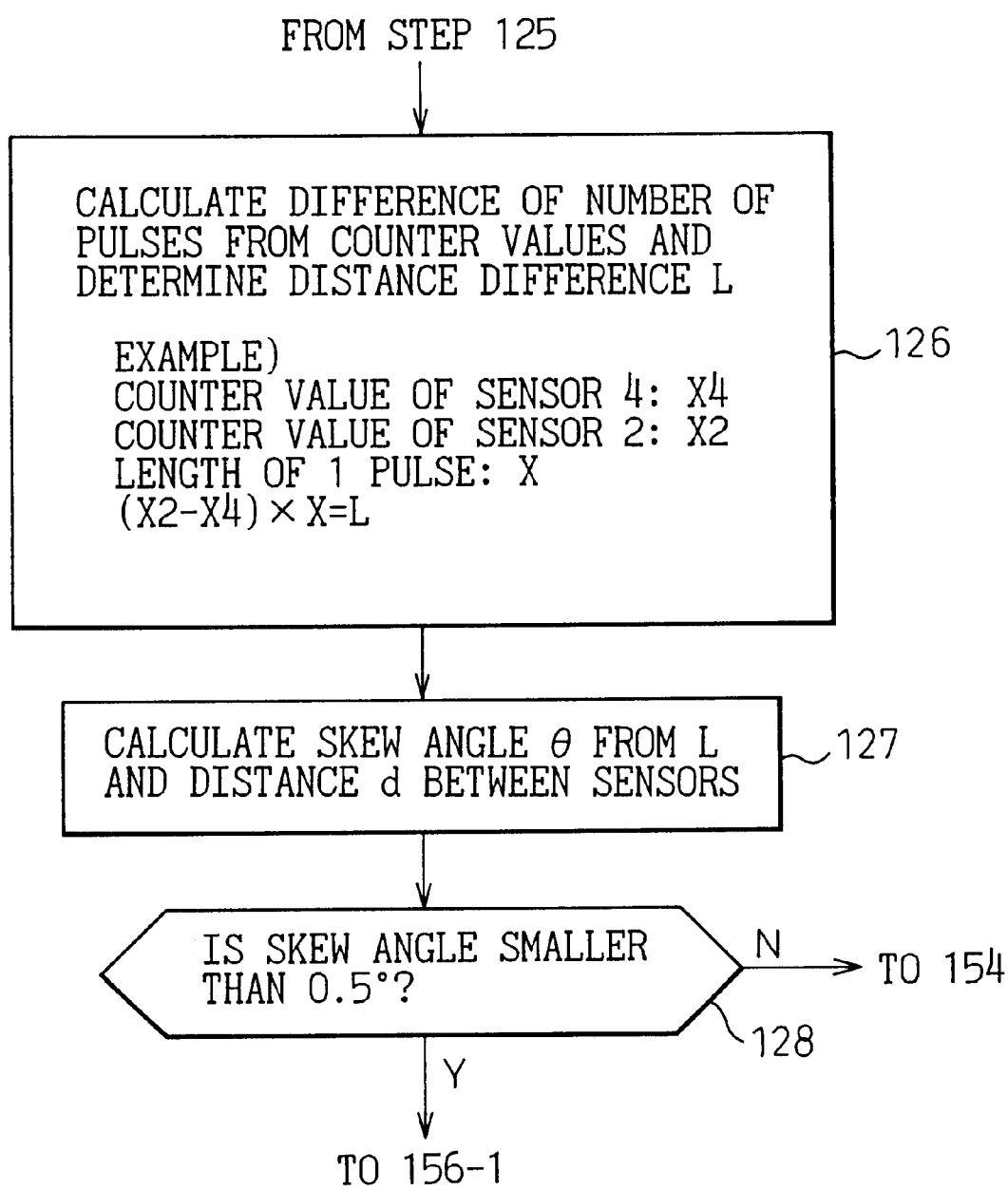

However, when a document is conveyed with a skew as shown in FIG. 8, differences arise in the time at which the four sheet passage detection sensors detect the passage of the sheet. FIGS. 9A and 9B show a flow chart of a calculation process for calculating the skew angle based on the differences in the detection time of sheet passage. Steps 121~128 in FIGS. 9A and 9B show details of processing in steps 150~153 in FIG. 12A to be described later.

Figure 10:
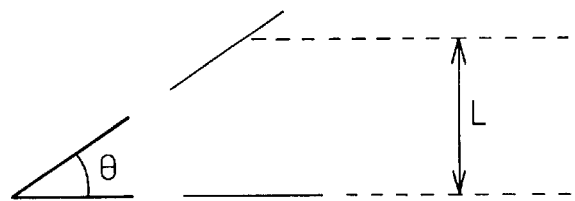
FIG. 10 is a view useful for explaining the distance L.

First, when the sheet is picked by the pick roller 31 (121), count-timers are started for calculation of the amount of skew (122). The count-timers correspond to the respective sheet passage detection sensors 35, and count the time after the sheet is picked by the pick roller 31 until the sheet is detected by the passage sensors 35. When the sheet is detected by the sheet passage sensor 35, the timer is stopped (123). The counter value of the sensor that was the first to detect the sheet and the counter value of the sensor that was the second to detect the sheet are read (124), and the two counter values are compared to obtain the tilting direction of the skew from the comparison result (125). FIG. 10 is a view useful for explaining the distance L. Difference of counter values of the two sensors is used to obtain the difference in number of pulses and to calculate the distance L therefrom (126). Then, the skew angle θ is calculated from the distance L and the distance between the two sensors (127). The distance L is the amount of displacement of the sheet that is conveyed at a constant speed, when the timing of detection of the sheet is different between the two sensors, during this difference of the timing. Therefore, the skew angle can be calculated from the known distance between the two sensors and above-mentioned distance L. Based on the skew angle of the document obtained in above described steps, a skew error correction processing is selected (128).

If the skew angle of the sheet is within the range of allowable skew, skew error correction processing is not performed and the result of reading in the image reader is accepted as it is. For example, if the tilting angle is around 0.5° for the width of A4 sheet, 210 mm, actual amount of deviation is in the range of 1 to 2 mm. In this case, the result of reading may be output as it is rather than performing skew error correction that requires significant processing time.

On the contrary, when the skew angle is larger than a certain value, the sheet may continue to rotate further while being conveyed to the image reader. Thus, it is possible that, when the sheet reaches the image reader, the skew angle may become larger than the skew angle calculated at the sheet detection sensor unit. In the image reading apparatus according to the present invention, documents are conveyed utilizing the center line of the apparatus as reference, and a conveyance roller is provided on the center line of the apparatus. When the documents to be read are set and the sheet guide is adjusted to meet the width of the sheets, the width of the sheet guide may sometimes become larger than the actual width of the sheets since the documents are used sheets and are irregular in size with surfaces of different qualities.

If the sheet is conveyed in this condition, the conveyance roller of the apparatus that is to be centered on the center line of the conveyance direction of the sheet may deviate from the center of the sheet. As a result, the sheet is conveyed with the conveyance roller touching the portion deviated either to the left or the right from the center of the sheet. When the sheet is conveyed in this condition, the sheet is fed more on the left or the right side on which the roller touches with respect to the center. This causes rotation of the sheet, and gives rise to skew. The more the set width of the guide deviates from the actual width of the sheet, the more prominent becomes this phenomenon.

If the skew angle calculated at the sheet passage detection sensors is greater than a certain value, for example greater than 10° and if the sheet is conveyed still further, it is expected that the amount of skew will continue to increase until the sheet reaches the image reader. That is, when the skew angle is large, it is possible that the sheet is conveyed in the state of rotation with the center deviating from the center line of the conveyance path. In this case, the amount of skew of the sheet cannot be determined until the sheet is sandwiched and fixed between feed rollers, so that it becomes necessary to detect an accurate amount of skew at the time of reading in the image reader. Therefore, according to the present invention, if the amount of skew calculated at the sheet passage detection sensors is greater than a predetermined angle, the backing in the image reader is switched from usual white color to black and the amount of skew is detected simultaneously with reading of the image.

It is desirable that correction of the reference value for white, in which the white color of the backing is read before image reading and the reference value is corrected based on the output value, be started at the time of detection of the document in the skew detection sensor. At the time when the leading edge of the document is detected, the output value from CCD is read, and is subjected to A/D conversion, to be used as the reference value for white color. By performing this operation each time before image reading, a reference value that exactly follows the variation of light intensity or the fluctuation of the CCD can be set.

Next, correction of the reference value for white color according to another embodiment will be described.

Figure 11:
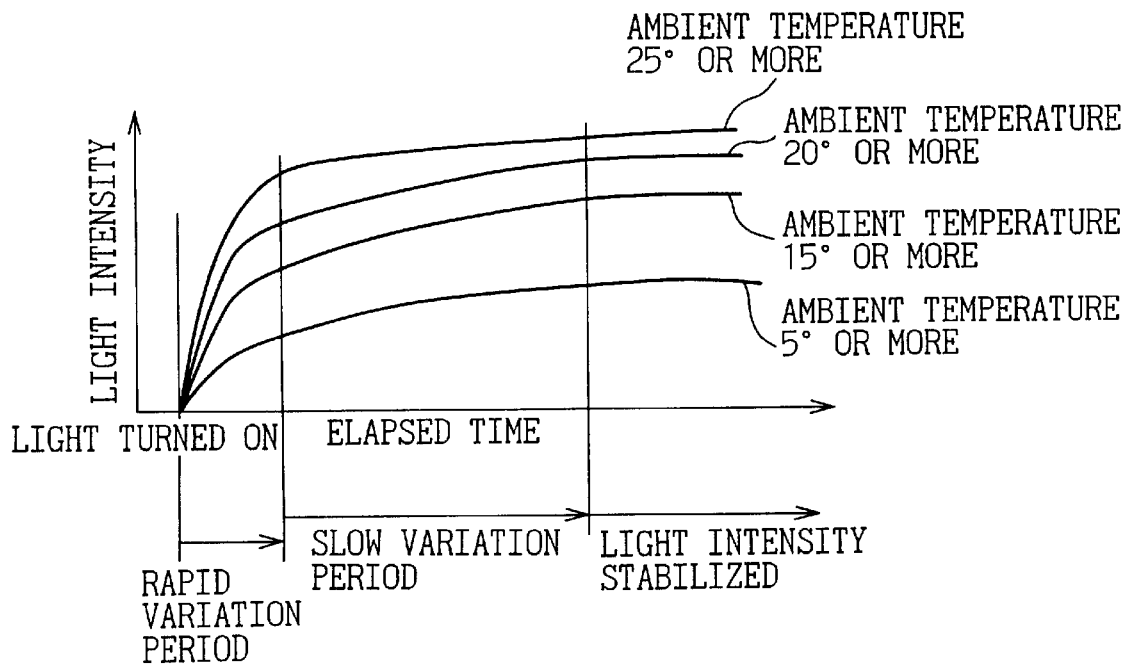
FIG. 11 is a graph showing the variation of light intensity.

FIG. 11 is a graph showing the variation of light intensity of a light source after it was turned on when the ambient temperature is constant. From FIG. 11, it can be seen that, after an initial period of rapid increase, the light intensity of the light source increases more slowly in the following period and finally settles to a stable value. According to the experimental result, in the case of ambient temperature of 15° C., the initial period of rapid increase is 5 seconds, the period of slow variation is from 5 seconds until 200 seconds, and stable period is from 200 seconds afterward. The lengths of the period of the initial rapid variation, the period of the slow variation and the stable period differ depending upon the ambient temperature. Therefore, the light intensity is monitored after the light source is turned on, and if, during continuous reading operation, the next correction timing for correcting the reference value for white color occurs, after completion of document reading operation for one sheet, the backing is switched from black to white, and after the output value for white backing is taken in, the backing is switched from white back to black and the reading operation is resumed. Thus, depending upon the variation of the light source, the backing is suitably changed to white to correct the reference value for white. In this manner, the overall reading speed is improved, for continuous conveyance, in an image reading apparatus.

Figure 12A:
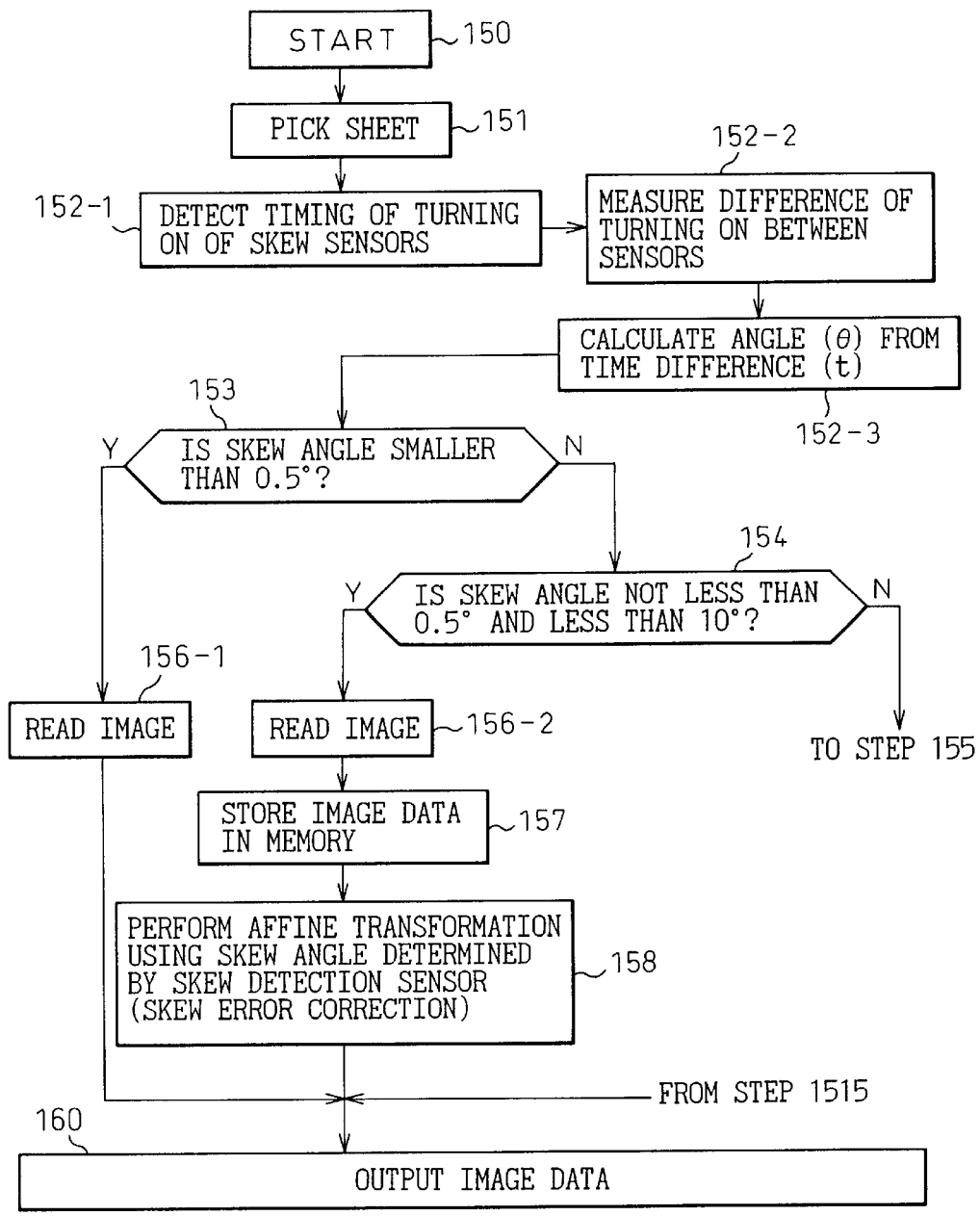
FIGS. 12A and 12B show a flow chart of selection operation of skew error correction process.
Figure 12B:
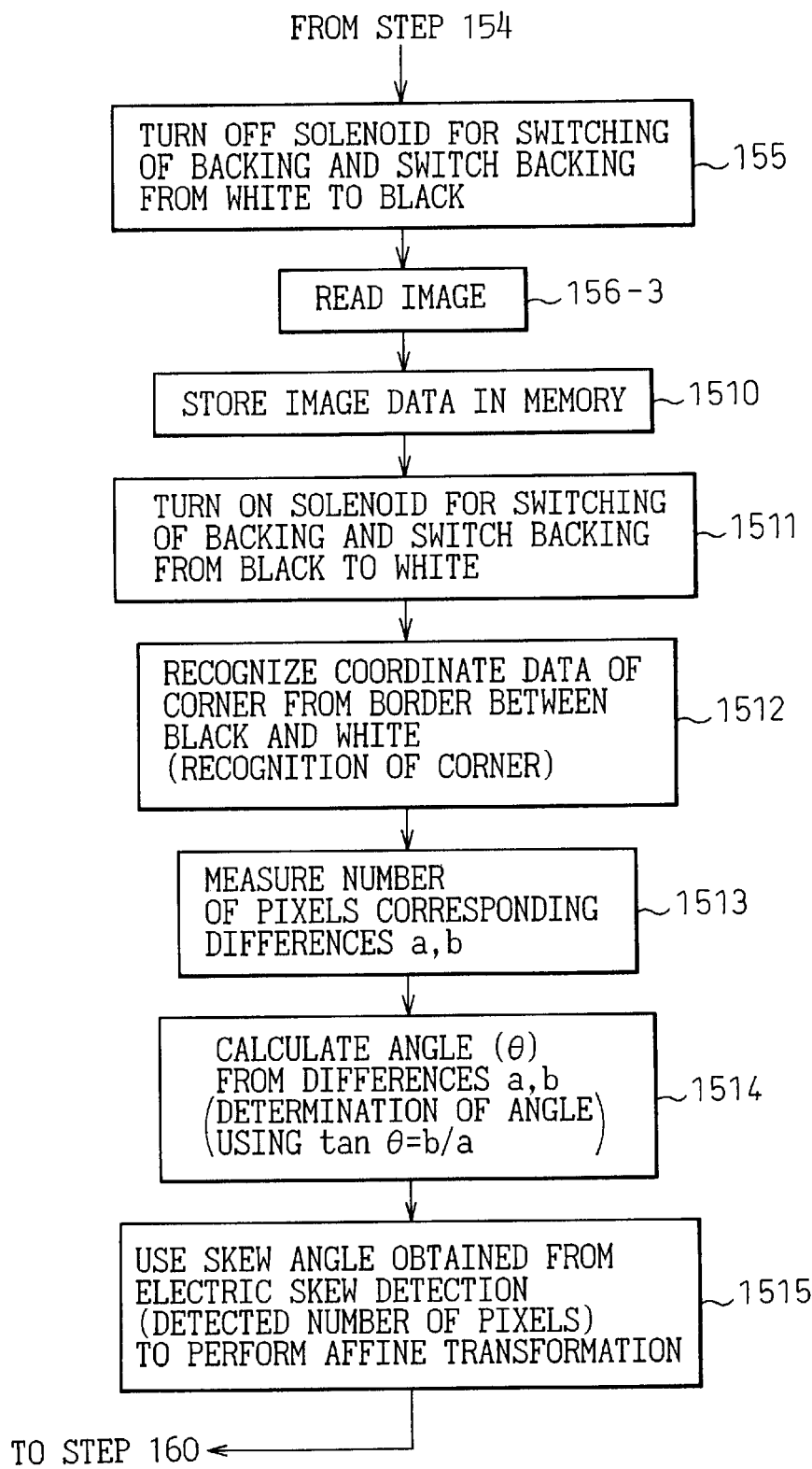

FIGS. 12A and 12B show a flow chart of selection operation of calculating the skew angle of the sheet in the sheet passage detection sensors of the present invention, and then selecting skew error correction processes depending on the skew angle.

First, the image reading apparatus is started (150), and a sheet is picked (151). Then, the skew angle of the sheet is detected from difference of time between the sheet passage detection sensors that detect the passage of the sheet (152-1, 2, 3), and from the result, the skew angle is calculated. Based on the calculated skew angle, suitable skew error correction processing is selected (153). If the skew angle is within the range of allowable skew, for example within 0.5°, the image is read in the image reader (156-1), and image data are output from the image processing unit without performing skew error correction (160).

If the skew angle is outside the range of allowable skew, it is determined whether or not it is within a specified range, for example within the range not less than 0.5° and not more than 10° (154). If it is within this range, the image is read in the image reader with the backing remaining white (156-2), the read image is stored in the memory (157), the skew angle is calculated from difference of detection time between the transmission type sensors, and skew error correction processing corresponding to the calculated skew angle, for example an affine transformation, is performed (158). Skew error correction methods will be described later. After the skew error correction processing is performed on the read image data, the image data are output (160).

If the skew angle is beyond the specified range, for example 10° or more, the amount of skew may increase while the sheet continues to be conveyed and when the sheet reaches the image reader, even after the skew angle was calculated at the sheet passage detection sensors.

Then, the backing in the image reader is changed from usual white color to black (155) and the document is read (156-3). There is no problem in the reference value since correction of the reference value for white backing has already been done. The read image is stored in the memory (1510), and then the backing is changed back to white for next document (1511) and, from the read image, the coordinate data of corners and the border between black and white are determined to recognize the image (1512). The amount of difference is measured in number of pixels (1513) and skew angle is calculated from the amount of difference (1514). Detail of the detection method for detecting the amount of skew with black backing will be described later. After the final amount of skew is detected (detection of the skew angle from the number of pixels), skew error correction of the read image is performed (1515), and the image data are output (160).

Figure 13:
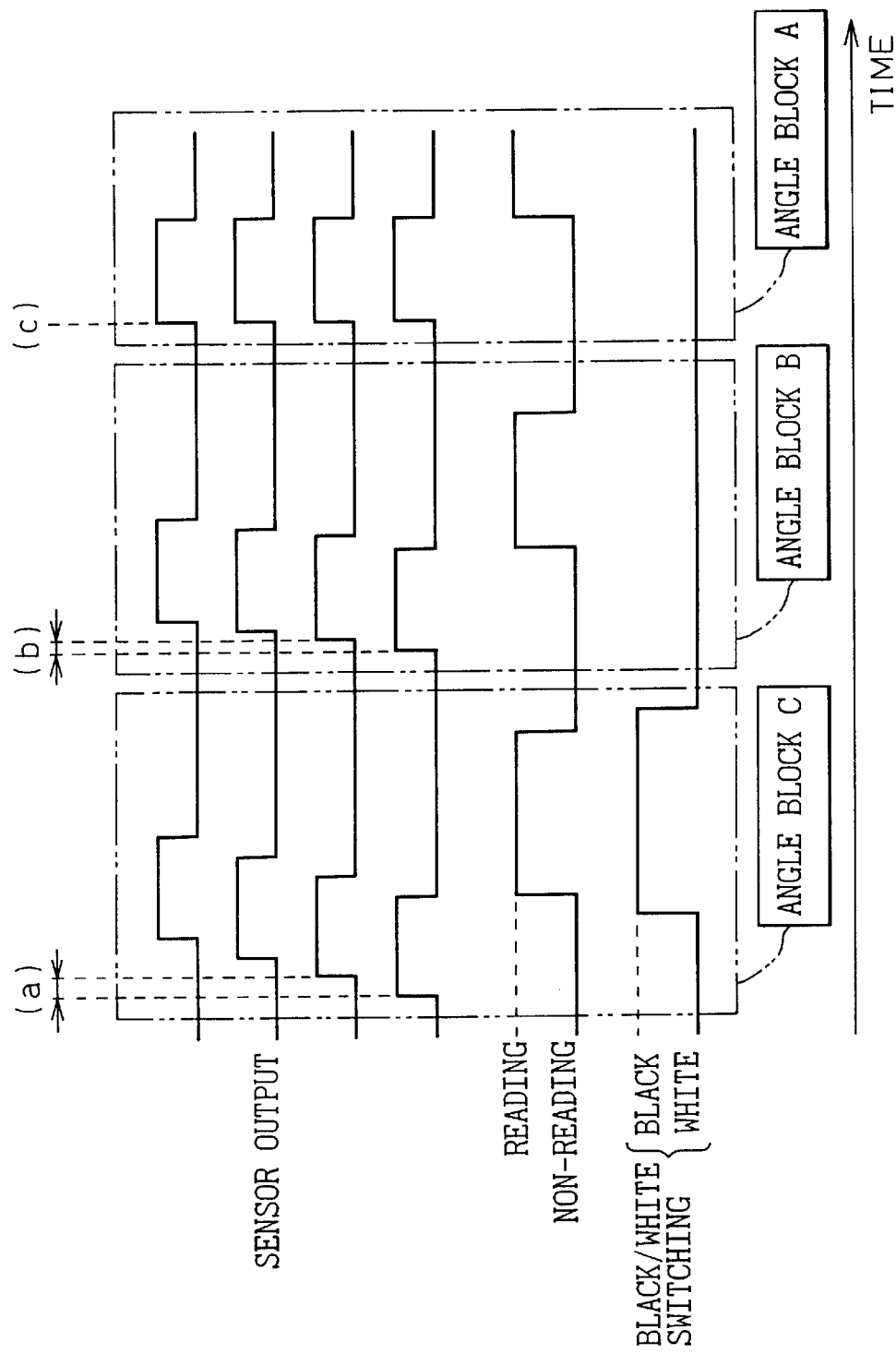
FIG. 13 is a view useful for explaining the skew sensors and backing switching during reading operation.

FIG. 13 is a timing chart showing output results of skew detection sensors, image reading operation and the state of the backing.

When the time difference, of sheet detection, between sheet passage detection sensors is large (a), image reading is performed with the backing changed from white to black. A skew angle is detected using the image read in the image reader, and skew error correction is performed based on this skew angle.

When a time difference, of sheet detection, between skew detection sensors is moderate (b), if the skew angle calculated from this difference is within the specified range, for example within the range of not less than 0.5° and not more than 10° in this embodiment, image reading is performed without changing the backing and skew error correction processing is performed based on the skew angle calculated by the skew detection sensors.

When there is little difference in the timing of sheet detection between the sheet passage detection sensors (c), image reading is performed with the backing remaining white, and skew error correction processing is not performed.

A reference angle such as 0.5° or 10°, which is used as the reference of skew angle in this embodiment, depends upon the distance between the sheet detection sensors and the feed rollers. In an apparatus in which this distance is short, the reference angle is set large, and in an apparatus in which this distance is long, the reference angle is set small.

Figure 14:
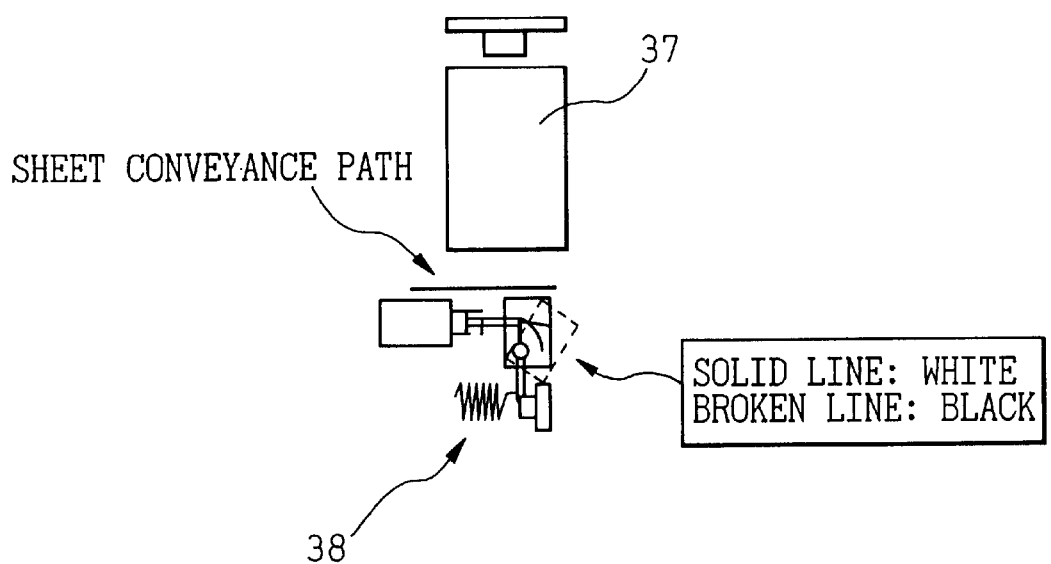
FIG. 14 is a view showing the mechanism for backing switching.

FIGS. 14 and 15 are views showing details of the mechanism for a backing switching unit. FIG. 14 is an enlarged view showing the optical unit 37 and the backing switching unit 38 of FIG. 3.

Figure 15A:
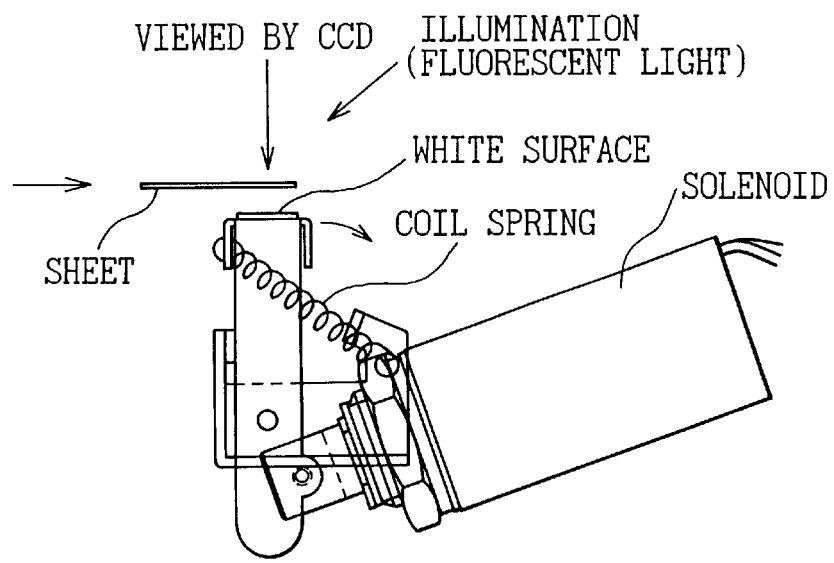
FIGS. 15A and 15B are views showing detail of the mechanism for backing switching.
Figure 15B:
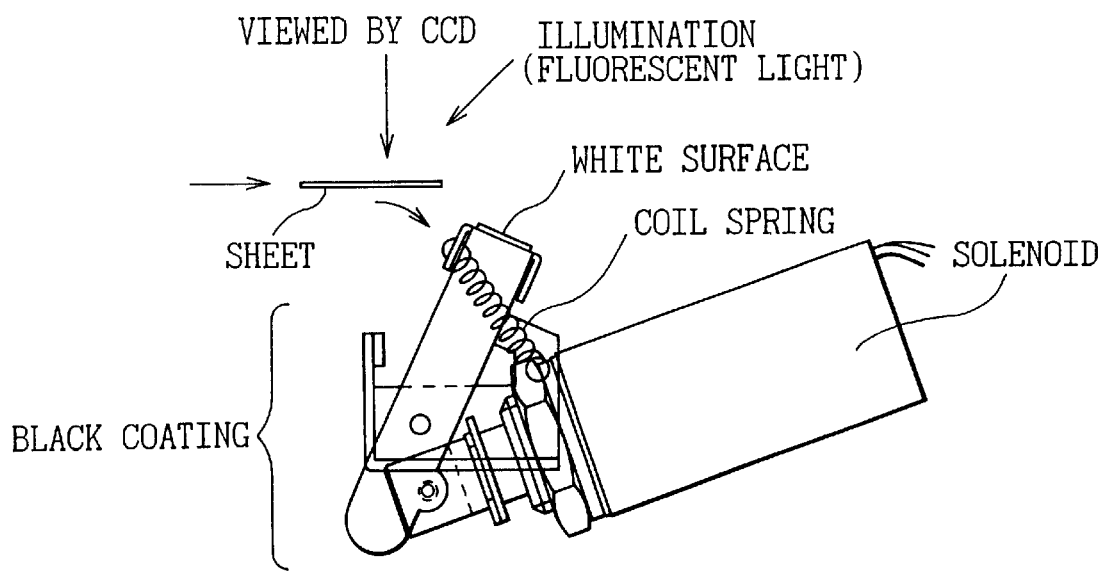

When the solenoid is ON as shown in FIG. 15A, the white surface of the backing appears in the lower portion of the image reader. If the skew angle calculated in the skew detection sensors is large, the solenoid is turned OFF to change the backing from white to black, and then the image is read. This state is shown in FIG. 15B.

In an actual image reading apparatus, there is no problem in using the skew detection sensor as a common sensor for detecting the passage of the document or size of the sheet.

Next, a skew error correction means for correcting a skew of an image will be described.

Figure 16:
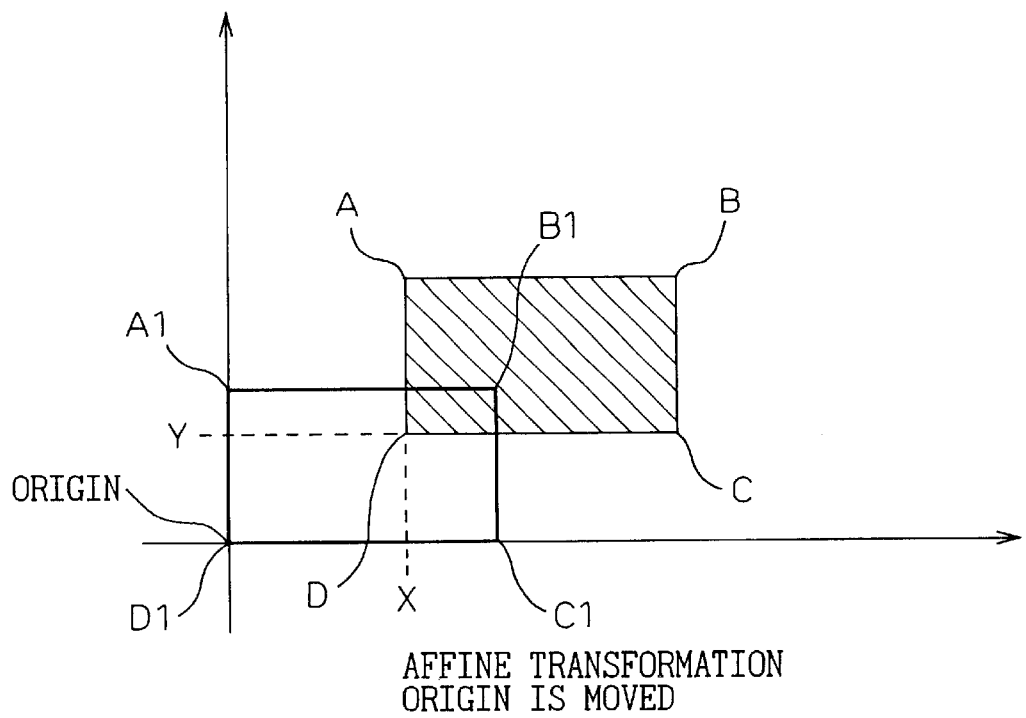
FIG. 16 is a view useful for explaining two dimensional linear transformation.
Figure 17:
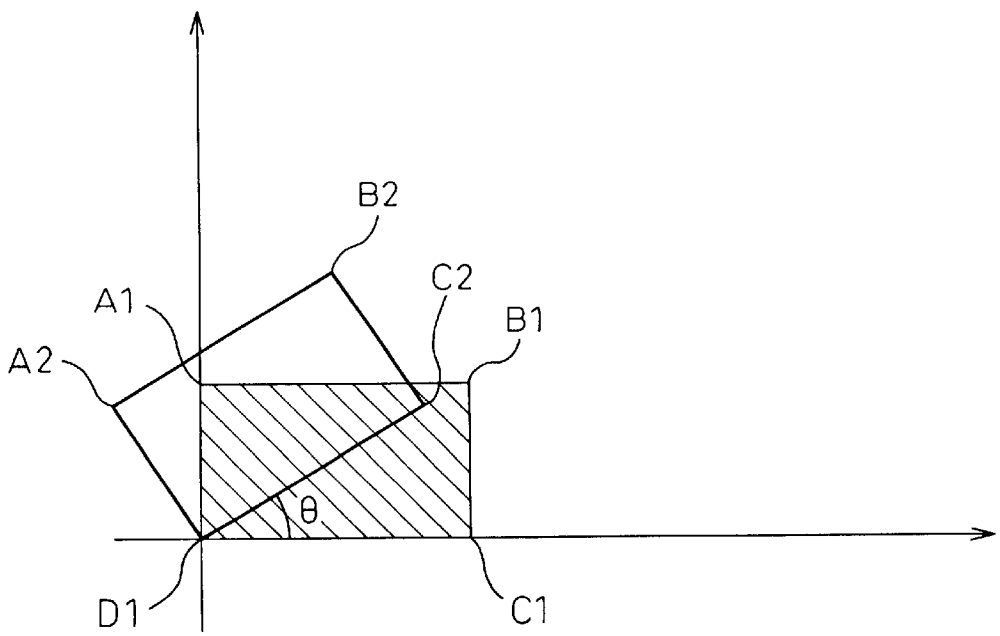
FIG. 17 is a view useful for explaining two dimensional linear transformation.

Generally, the method of two dimensional affine transformation is well known as the two dimensional linear transformation that performs translation and rotation on the read image. As shown in FIG. 16, a rectangle can be represented by the coordinates of four vertices A, B, C, D. When this rectangle is subjected to translation in X-direction and Y-direction, the four vertices are transformed to A1, B1, C1, D1, respectively. When, steps 1512 to 1515 are executed as shown in FIG. 17, this is rotated about the origin by an angle θ, the four vertices are finally transformed to A2, B2, C2, D1, respectively. Skew error correction is performed on the read image in this manner.

Next, electrical skew detection means according to an embodiment will be described in the case of a color image reading apparatus.

In the case of a color image reading apparatus, there is a problem that, when the skew angle is detected using RGB image data obtained from a color CCD in the image reader, the skew angle is difficult to detect if the background color is the complementary color of green. It is possible to detect the skew angle using each of the RGB image data. Then, however, the size of the circuit for skew angle detection is tripled. In addition, if there are differences in the respective detection results from each of R, G, B, it becomes necessary to determine which one of these detection results should be used for skew error correction. Moreover, if skew error correction processing is performed for each of the RGB image data, color difference may arise in the image after skew error correction.

Therefore, in an embodiment of a color image reading apparatus according to the present invention, the read image data obtained from a color CCD are transformed to image data in a predetermined normalized color space or uniform color space, and only the brightness component is used to detect the amount of skew for performing the image correction processing. This image correction processing will be described below with reference to FIGS. 18 to 21.

Figure 18:
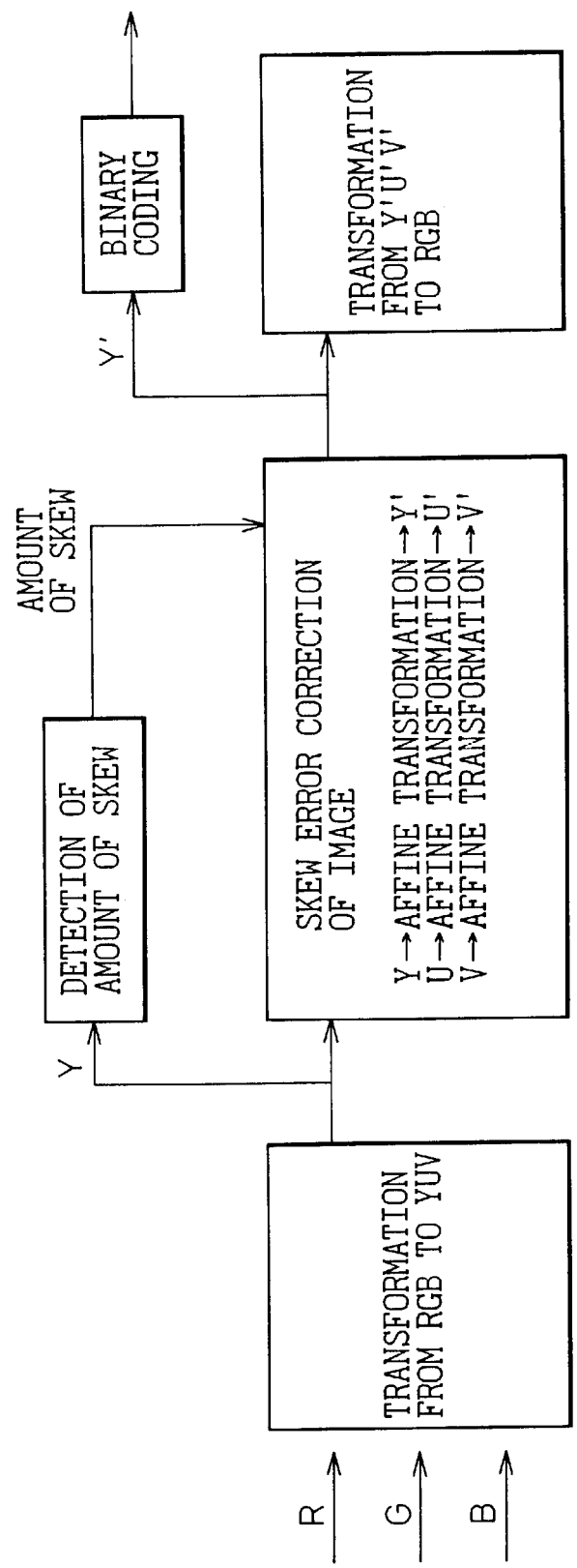
FIG. 18 is a block diagram showing the transformation to image data in normalized color space YUV.
Figure 19:
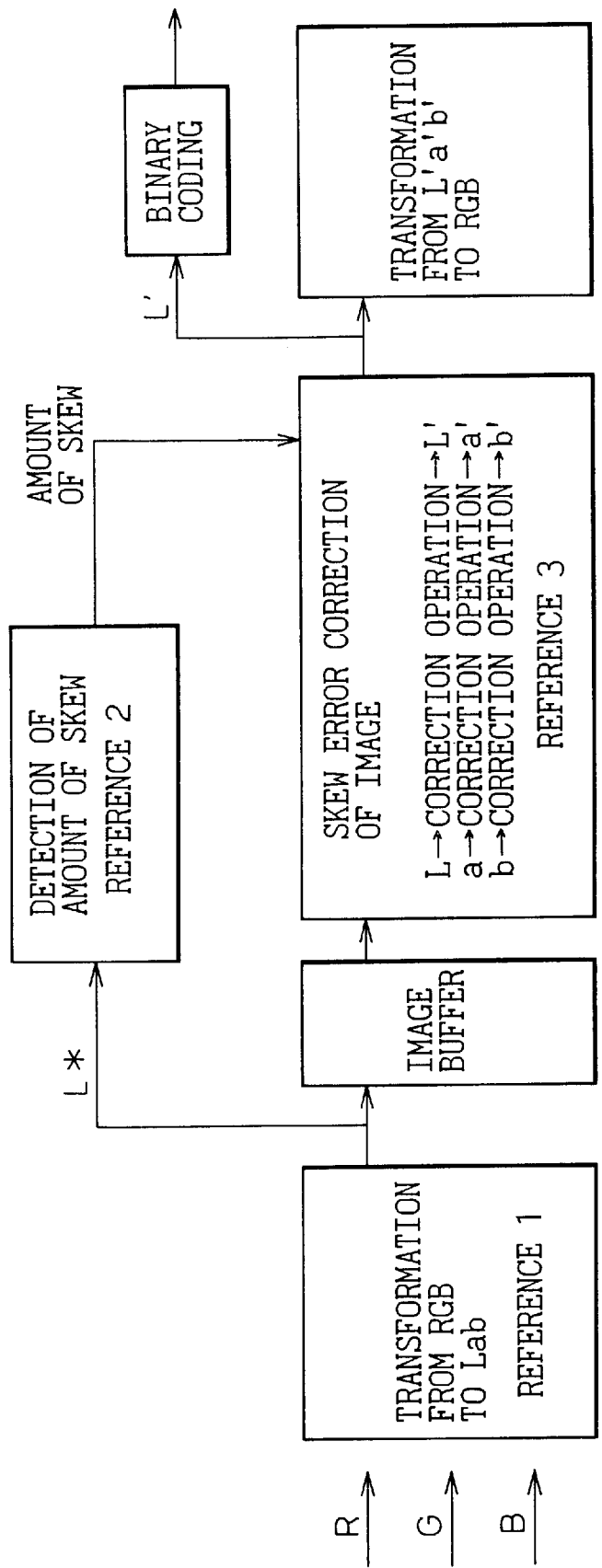
FIG. 19 is a block diagram showing the transformation to image data in isotropic color space Lab.

FIG. 18 is a block diagram showing the transformation of RGB image data obtained from a color CCD to the normalized color space YUV image data, and FIG. 19 is a block diagram showing the transformation of RGB image data obtained from a color CCD to the uniform color space Lab image data. The normalized color space YUV and the uniform color space Lab are color representation spaces in which color difference as viewed by human eyes is represented so as to be in proportion to the actual difference of the numerical values.

Thus, the backing is changed to black using the backing switching means, and the RGB image data read by the image reader comprising a color CCD are transformed to image data in the normalized color space or the uniform color space. The component Y or the component L of high luminance is used to detect the amount of skew. By performing skew error correction based on this result, image data having little color difference can be obtained after correction. Since the Y component and the L component are brightness components, the border of the image in the document can be determined with high precision.

Since image data in the color space of RGB are transformed to image data in the normalized color space or the uniform color space, the color space of RGB is reflected even after the operation of the skew error correction. Therefore, a logical correction result can be obtained.

Equation for the transformation of RGB data to image data in the normalized color space (YUV) or the uniform color space (Lab) is shown as Eq. 1.

$$\begin{pmatrix} X \\ Y \\ Z \end{pmatrix} = \begin{pmatrix} 2.7690 & 1.7517 & 1.1301 \\ 1.0 & 4.5907 & 0.0601 \\ 0 & 0.0565 & 5.5928 \end{pmatrix} \begin{pmatrix} R \\ G \\ B \end{pmatrix} \quad (1)$$

where $L=116(Y)^{1/3}$ $a=500[(X)^{1/3}-(Y)^{1/3}]$ $b=200[(X)^{1/3}-(Y)^{1/3}]$ $u=4X/(X+15Y+3Z)$ $v=9Y/(X+15Y+3Z)$ Next, the method for skew angle detection using the L component will be described with reference to read image data.

Figure 20:
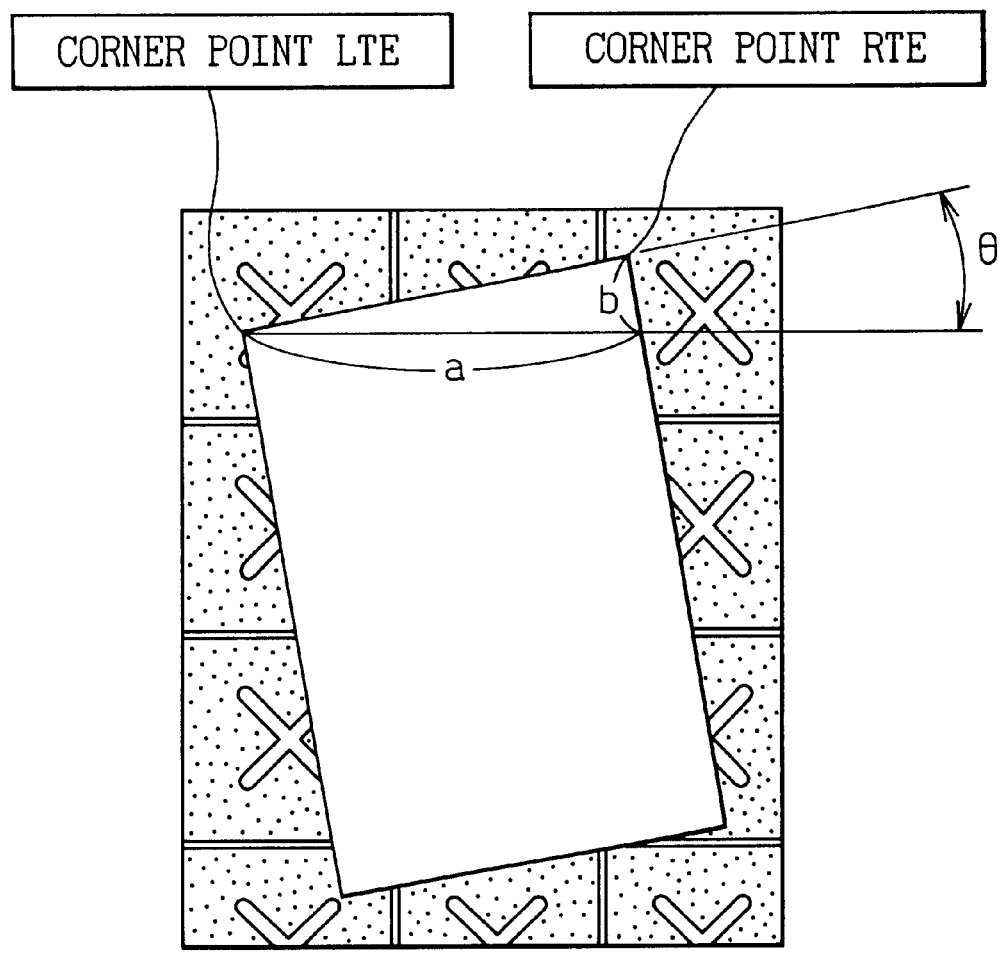
FIG. 20 is a view useful for explaining a skew of image data.

First, LTE and RTE are determined. LTE and RTE are as shown in FIG. 20. The image is first searched successively in the main scanning direction, and the coordinate where white occurs first and the coordinate where white occurs last are stored in the memory. The same operation is performed for a predetermined number of lines. Then, from the stored coordinate data, the coordinate data where white occurs first are searched from top to bottom. Let these coordinates be Ptx, Pty. Next, from the coordinate data where white begins to occur, data that show the leftmost coordinates are searched. Let these coordinates be Plx, Ply. Then, from the coordinate data where white ceased to occur, data that show the right most coordinates are searched. Let these coordinates be Prx, Pry. From among these points, two points having smaller Y-coordinate are determined. The point with smaller X-coordinate is the point LTE, and the point with larger X-coordinate is the point RTE. If Ply>Pty and Ply>Pry, the sheet is skewed in clockwise direction, and if Pry>Pty and Pry>Ply, the sheet is skewed in anti-clockwise direction.

Let LTE coordinates be Ltex, Ltey, and let RTE coordinates be Rtex, Rtey. Then, the skew angle is calculated from Equation (2).

$$\text{Tan } \theta = (Rtey-Ltey)/(Rtex-Ltex) \quad (2)$$

Equation for the coordinate transformation of skew error correction operation (linear interpolation operation) in order to perform skew error correction after the skew angle θ is calculated, is shown as Equation (3).

Equation for coordinate transformation $$\begin{pmatrix} Dx \\ Dy \end{pmatrix} = \begin{pmatrix} A & B \\ C & D \end{pmatrix} \begin{pmatrix} Sx \\ Sy \end{pmatrix} \quad (3)$$

In Equation (3), Dx is X-coordinate after transformation, Dy is Y-coordinate after transformation, Sx is X-coordinate in the original image before transformation, and Sy is Y-coordinate in the original image before transformation.

$$A=D=\cos \theta \quad B=C=\sin \theta \quad (4)$$

Figure 21:
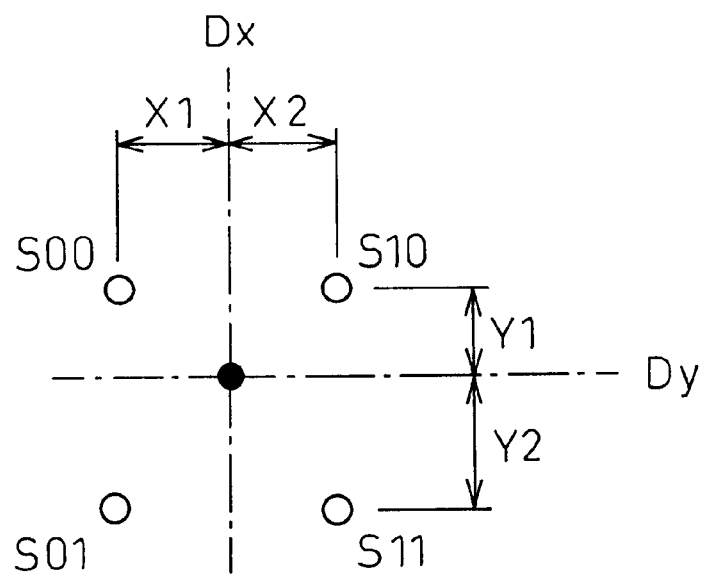
FIG. 21 is a view useful for explaining skew error correction calculation (linear interpolation calculation).

From above equations (3) and (4), the coordinate Dx and coordinate Dy after transformation are determined, and four points nearest to the coordinates after transformation in the original image before transformation are extracted. Let these points be S00, S10, S01, S11, as shown in FIG. 21. Image density D of the obtained point is determined by Equation (4) from the density value of the neighboring four points.

$$D=DS00 \times NX2 \times NY2+DS10 \times NX1 \times NY2+DS01 \times NX2 \times NY1+DS11 \times NX1 \times NY1 \quad (5)$$

This is referred to as a linear interpolation operation, where:

$$NX1=X1/(X1+X2),\ NX2=X2/(X1+X2)\ NY1=Y1/(Y1+Y2),\ NY2=Y2/(Y1+Y2) \quad (6)$$

and DS00, DS10, DS01, DS11 are density values of S00, S10, S01, S11.

The present invention may be applied to an apparatus such as a copying machine, a facsimile, or a character recognition apparatus, in which the stacked medium is conveyed along a conveyance path and image reading is performed. The same operative effect can be obtained if the present invention is applied to an apparatus in which the medium is being conveyed while image reading is performed or to an apparatus in which the conveyed medium is stopped while the image reading means moves along the medium for reading the image on the medium. The present invention is also effective in an apparatus in which the medium is not conveyed but stopped on the conveyance path when the state of the medium is detected by medium detection means.

As described above, based on the skew angle calculated during the sheet conveyance, the present invention has made it possible to minimize the time required for skew error correction processing by selecting the detection method suitable for the skew angle. Optimum skew error correction can be thereby realized at high speed in an image reading apparatus which can operate at high speed.

High speed processing is also made possible by providing an automatic backing switching function and by switching from the backing for reference correction in the usual image reading to the backing suitable for skew detection only when skew detection in the image reader is necessary. In addition, optimum skew error correction processing can be realized, at high speed, also in an apparatus in which color image reading is possible.

What is claimed is:

1. An image reading apparatus that conveys a stacked medium along a conveyance path, reads an image on the medium, and discharges the medium after reading the image, said apparatus comprising:

calculation means for calculating the amount of skew of said medium while being conveyed; and correction means for correcting said amount of skew of the medium in accordance with the amount of skew calculated by said calculation means;

wherein said correction means comprise:

determination means for determining whether correction of said amount of skew should be performed or not; and control means for correcting said amount of skew of the medium when said determination means determine that correction of said amount of skew should be performed;

wherein said calculation means comprise image reading means for reading an image of the medium being conveyed along said conveyance path at a point closer on the conveyance path to the discharging side than said medium detection means, and calculate said amount of skew from the image data of the medium read by the image reading means, and said determination means determine whether correction of said amount of skew should be performed or not based on the amount of skew of said medium calculated by said calculation means;

wherein said control means comprise selection means for selecting, when said determination means determine that correction of said amount of skew should be performed, such that the correction of the amount of skew is performed using a first correction control means that amends said amount of skew based on an amount of skew of the medium calculated from the detected result of the state of the medium by said medium detection means if the amount of skew is within a predetermined amount, and using a second correction control means that amends said amount of skew based on an amount of skew of the medium calculated from the image data of the medium read by said image reading means if the amount of skew is beyond the predetermined amount.

2. An image reading apparatus according to claim 1, wherein said calculation means comprise image reading means for reading an image of the medium being conveyed along said conveyance path at a point closer on the conveyance path to the discharging side than said medium detection means, and calculate said amount of skew from the image data of the medium read by the image reading means, and said determination means determine whether correction of said amount of skew should be performed or not based on the amount of skew of said medium calculated by said calculation means.

3. An image reading apparatus according to claim 2, wherein said control means comprise second correction control means for correcting the amount of skew based on said amount of skew of the medium calculated by said calculation means when said determination means determine that correction of said amount of skew should be performed.

4. An image reading apparatus according to claim 1, wherein said second correction control means comprise a plurality of backings which are provided at a position opposite to said image reading means for reading the image of said medium being conveyed in relation to said medium, and which change the reflectivity of light incident on the medium from the side of the image reading means, and backing switching means for selectively switching to one of said plurality of backings, and wherein, when said determination means determine that correction for said amount of skew should be performed, the backing is switched to the one selected by said backing switching means, image data on said medium being read after the switching, said amount of skew being calculated from the read image data by said calculation means, and said amount of skew being corrected based on the calculated result.

5. An image reading apparatus according to claim 4, wherein calculation of said amount of skew is performed such that the position of the corner of said medium is first read from said image data, and said amount of skew is calculated from the position data of said corner and conveyance speed of said medium conveyed on said conveyance path.

6. An image reading method that conveys a stacked medium along a conveyance path, reads an image on the medium, and discharges the medium after reading the image, said method comprising:

a calculation step of calculating the amount of skew of said medium while being conveyed; and a correction step of correcting the amount of skew of said medium in accordance with the amount of skew calculated in said calculation step;

wherein said correction step comprises:

a determination step of determining whether correction of said amount of skew should be performed or not; and a control step of correcting the amount of skew of said medium when said determination step determines that correction of said amount of skew should be performed;

wherein said calculation step comprises an image reading step of reading an image of the medium at a position closer on the conveyance path to the discharging side than the position at the time of detection of said medium being conveyed along said conveyance path, and calculates said amount of skew from the image data of the medium read by the image reading step, and said determination step determines whether correction of said amount of skew should be performed or not based on the amount of skew of said medium calculated by said calculation step;

wherein said control step comprises selection step of selecting, when said determination step determines that correction of said amount of skew should be performed, such that the correction of the amount of skew is performed using a first correction control step for amending said amount of skew based on an amount of skew of the medium calculated from the detected result of the state of the medium in said medium detection step if the amount of skew is within a predetermined amount, and using a second correction control step for amending said amount of skew based on an amount of skew of the medium calculated from the image data of the medium read in said image reading step if the amount of skew is beyond the predetermined amount.

7. An image reading method according to claim 6, wherein said calculation step comprises an image reading step of reading an image of the medium at a position closer on the conveyance path to the discharging side than the position at the time of detection of said medium being conveyed along said conveyance path, and calculates said amount of skew from the image data of the medium read by the image reading step, and said determination step determines whether correction of said amount of skew should be performed or not based on the amount of skew of said medium calculated by said calculation step.

8. An image reading method according to claim 7, wherein said control step comprises a second correction control step of correcting the amount of skew based on said amount of skew of the medium calculated by said calculation step when said determination step determines that correction of said amount of skew should be performed.

9. An image reading method according to claim 6, wherein said second correction control step comprises a backing switching step of selectively switching to one of a plurality of backings which are provided at a position opposite to an image reading means for reading the image of said medium being conveyed in relation to said medium, and which change the reflectivity of light incident on the medium from the side of the image reading means, and wherein, when said determination step determines that correction for said amount of skew should be performed, the backing is switched to the one selected by said backing switching step, image data on said medium being read after the switching, said amount of skew being calculated from the read image data in said calculation step, and said amount of skew being corrected based on the calculated result.

10. An image reading method according to claim 9, wherein calculation of said amount of skew is performed such that the position of the corner of said medium is first read from said image data, and said amount of skew is calculated from the position data of said corner and conveyance speed of said medium conveyed on said conveyance path.

\* \* \* \* \*